(12) United States Patent
Baxter et al.

(10) Patent No.: US 8,434,310 B2
(45) Date of Patent: May 7, 2013

(54) TRIM VALVES FOR MODULATING FLUID FLOW

(75) Inventors: Randy C. Baxter, Taylors, SC (US); Jerry L. Goeke, West Des Moines, IA (US)

(73) Assignee: Delavan Inc, West Des Moines, IA (US)

( * ) Notice: Subject to any disclaimer, the term of this patent is extended or adjusted under 35 U.S.C. 154(b) by 798 days.

(21) Appl. No.: 12/630,141

(22) Filed: Dec. 3, 2009

(65) Prior Publication Data

US 2011/0131947 A1 Jun. 9, 2011

(51) Int. Cl.
  *F02C 1/00* (2006.01)
(52) U.S. Cl.
  USPC .............. 60/772; 60/39.281; 251/129.09
(58) Field of Classification Search ........... 60/39.281, 60/734, 740–741, 772; 137/613, 637; 251/129.09, 251/129.1, 129.11, 208, 343, 344, 345
  See application file for complete search history.

(56) References Cited

U.S. PATENT DOCUMENTS

| | | | |
|---|---|---|---|
| 2,468,584 | A | 4/1949 | Wotring |
| 2,975,785 | A | 3/1961 | Sheldon |
| 3,305,282 | A | 2/1967 | Arneson |
| 3,352,155 | A | 11/1967 | Penet |
| 3,532,121 | A | 10/1970 | Sturman et al. |
| 3,689,773 | A | 9/1972 | Wheeler |
| 3,762,442 | A | 10/1973 | Paul |
| 3,772,540 | A | 11/1973 | Benson |
| 4,133,511 | A * | 1/1979 | Hartmann et al. ....... 251/129.11 |
| 4,521,088 | A | 6/1985 | Masom et al. |
| 4,709,155 | A | 11/1987 | Yamaguchi et al. |
| 4,976,227 | A | 12/1990 | Draper |
| 5,051,631 | A | 9/1991 | Anderson |
| 5,071,105 | A | 12/1991 | Donze et al. |

(Continued)

FOREIGN PATENT DOCUMENTS

| | | |
|---|---|---|
| EP | 0638770 A1 | 2/1995 |
| EP | 0816760 A1 | 1/1998 |

(Continued)

OTHER PUBLICATIONS

Hermann et al.; "Active Instability Control (AIC) of Spray Combustors by Modulation of the Liquid Fuel Flow Rate"; Combust. Sci. and Tech., 1996, vol. 118, pp. 1-25.

(Continued)

*Primary Examiner* — Phutthiwat Wongwian
(74) *Attorney, Agent, or Firm* — Edwards Wildman Palmer LLP; Scott D. Wofsy; Joshua L. Jones

(57) ABSTRACT

A trim valve includes a valve housing having an inlet section and an outlet section. A valve shaft is mounted to the valve housing to be stationary with respect thereto. The valve shaft includes an internal flow passage in fluid communication with the outlet section of the valve housing. A valve rotor is disposed inboard of the valve housing and outboard of the valve shaft for modulating flow through the valve housing. The valve rotor is mounted for rotational movement within the valve housing between a fully open position in which a flow path is defined between the inlet and outlet sections of the valve housing, and a reduced flow position in which the valve rotor at least partially blocks the flow path. An actuator is operatively connected to the valve housing to actuate the valve rotor between the fully open and reduced flow positions.

22 Claims, 20 Drawing Sheets

U.S. PATENT DOCUMENTS

| | | | |
|---|---|---|---|
| 5,257,496 | A | 11/1993 | Brown et al. |
| 5,303,684 | A | 4/1994 | Brown et al. |
| 5,404,709 | A | 4/1995 | Mac Lean et al. |
| 5,450,727 | A | 9/1995 | Ramirez et al. |
| 5,474,234 | A | 12/1995 | Maley |
| 5,488,340 | A | 1/1996 | Maley et al. |
| 5,608,515 | A | 3/1997 | Shu et al. |
| 5,784,300 | A | 7/1998 | Neumeier et al. |
| 5,791,889 | A | 8/1998 | Gemmen et al. |
| 5,797,266 | A | 8/1998 | Brocard et al. |
| 5,809,769 | A | 9/1998 | Richards et al. |
| 5,828,797 | A | 10/1998 | Minott et al. |
| 5,857,320 | A | 1/1999 | Amos et al. |
| 5,961,314 | A | 10/1999 | Myhre et al. |
| 6,058,709 | A | 5/2000 | Richards et al. |
| 6,059,560 | A | 5/2000 | Richards et al. |
| 6,142,665 | A | 11/2000 | Haffner et al. |
| 6,205,764 | B1 | 3/2001 | Hermann et al. |
| 6,205,765 | B1 | 3/2001 | Iasillo et al. |
| 6,244,291 | B1 | 6/2001 | Hughes |
| 6,454,548 | B2 | 9/2002 | Falk et al. |
| 6,517,045 | B1 | 2/2003 | Northedge |
| 6,566,158 | B2 | 5/2003 | Eriksen et al. |
| 6,598,621 | B1 | 7/2003 | Wygnanski |
| 6,640,548 | B2 | 11/2003 | Brushwood et al. |
| 6,672,071 | B2 | 1/2004 | Woltmann |
| 6,688,534 | B2 | 2/2004 | Bretz |
| 6,773,951 | B2 | 8/2004 | Eriksen et al. |
| 6,848,667 | B1 * | 2/2005 | Wygnanski ............. 251/65 |
| 6,918,569 | B2 | 7/2005 | Jansen |
| 6,928,878 | B1 | 8/2005 | Eriksen et al. |
| 7,004,449 | B2 | 2/2006 | Jansen |
| 7,007,661 | B2 | 3/2006 | Warlick |
| 7,665,305 | B2 | 2/2010 | Cornwell et al. |
| 2002/0125336 | A1 | 9/2002 | Bretz |
| 2002/0134138 | A1 | 9/2002 | Philipp et al. |
| 2003/0056490 | A1 | 3/2003 | Anderson et al. |
| 2003/0056517 | A1 | 3/2003 | Brushwood et al. |
| 2003/0155031 | A1 | 8/2003 | Barton et al. |
| 2004/0154300 | A1 | 8/2004 | Woltmann |
| 2005/0107942 | A1 | 5/2005 | Nomura et al. |
| 2005/0180699 | A1 | 8/2005 | Shu et al. |
| 2005/0189021 | A1 | 9/2005 | Wygnanski |
| 2005/0247066 | A1 | 11/2005 | Myhre |
| 2006/0000219 | A1 | 1/2006 | Myhre |
| 2006/0213200 | A1 | 9/2006 | Critchley et al. |
| 2006/0219968 | A1 | 10/2006 | Jansen |
| 2007/0119147 | A1 | 5/2007 | Cornwell et al. |
| 2007/0151252 | A1 | 7/2007 | Cornwell et al. |
| 2008/0000214 | A1 | 1/2008 | Kothnur et al. |
| 2009/0013693 | A1 | 1/2009 | Ols et al. |
| 2009/0026398 | A1 | 1/2009 | Overman et al. |
| 2009/0049927 | A1 | 2/2009 | Spivak et al. |
| 2009/0077945 | A1 | 3/2009 | Cornwell et al. |
| 2009/0204306 | A1 | 8/2009 | Goeke et al. |
| 2009/0234555 | A1 | 9/2009 | Williams et al. |
| 2009/0277185 | A1 | 11/2009 | Goeke et al. |
| 2010/0071375 | A1 | 3/2010 | Myhre |

FOREIGN PATENT DOCUMENTS

| | | |
|---|---|---|
| EP | 0926325 A2 | 6/1999 |
| EP | 1559887 A2 | 8/2005 |
| GB | 2342504 A | 4/2000 |
| GB | 2342782 A | 4/2000 |
| GB | 2377555 A | 1/2003 |
| GB | 2380064 A | 3/2003 |
| GB | 2380065 A | 3/2003 |
| WO | WO-9930006 A2 | 6/1999 |
| WO | WO-0020786 A1 | 4/2000 |
| WO | WO-02086364 A1 | 10/2002 |
| WO | WO-03102454 A1 | 12/2003 |
| WO | WO-2005047670 A2 | 5/2005 |

OTHER PUBLICATIONS

Paschereit et al.; "Acoustic Control of Combustion Instabilities and Emissions in a Gas-Turbine Combustor"; Proceedings of the 1998 IEEE.

Haile et al.; "Characterization of a Liquid Fuel Injector under Continuous and Modulated Flow Conditions"; Part. Part. Syst. Charact. 15 (1998) 136-144.

Cohen et al.; "Active Control of Combustion Instability in a Liquid-Fueled Low-N0x Combustor"; Journal of Engineering for Gas Turbines and Power, Apr. 1999, vol. 121/281.

Heising et al.; "Periodic Liquid Fuel Sprays Combustion Processes and Their Damping of Combustion Instabilities"; American Institute of Aeronautics and Astronautics, 1999.

Johnson et al.; "Effects of Time Delay and System Noise Upon Active Control of Unstable Combustors"; American Institute of Aeronautics and Astronautics, 2001-0778.

Murugappan et al.; "Application of Extremum Seeking Controller for Suppression of Combustion Instabilities in Spray Combustion"; American Institute of Aeronautics and Astronautics, 2000-1025.

Magill et al.; "Combustion Dynamics and Control in Liquid-Fueled Direct Injection Systems"; American Institute of Aeronautics and Astronautics, 2000-1022.

Darling et al.; "Demonstration of Active Control of Combustion Instabilities on a Fuel-Scale Gas Trubine Combustor"; ASME Turbo Expo 2001, Jun. 4-7, 2001.

Wu et al.; "High Response Valve for Active Combustion Control"; Proceedings of ASME Turbo Expo 2001, Jun. 4-7, 2001.

Johnson et al.; "Demonstration of Active Control of Combustion Instabilities on a Full-Scale Gas Turbine Combustor"; American Society of Mechanical Engineers, Apr. 11, 2002.

Hoff, et al., "Closed-Loop Combustion Control using OH Radical Emissions"; Proceedings of ASME TURBOEXPO 2000, May 8-11, 2000, Munich Germany.

Natural Gas Fuel for General Electric Aircraft Derivative Gas Turbines in Industrial Applications, General Electric Company Marine & Industrial Engine Projects Department, Cincinnati, Ohio 45215, MID-TD-0001-1, Aug. 1985.

J.E. May; "Active Pattern Factor Control for Gas Turbine Engines", Published 1998 NASA. Available from http://www.grc.nasa.gov/WWW/RT/RT1997/5000/5540may.htm, Apr. 15, 1998 [cited based on URL content as of Jul. 9, 2009].

UK Intellectual Property Office Search Report dated Jan. 5, 2010 for U.K. Application No. GB0915455.0.

* cited by examiner

Large Rotor Restoring Force

Diminished Rotor Restoring Force

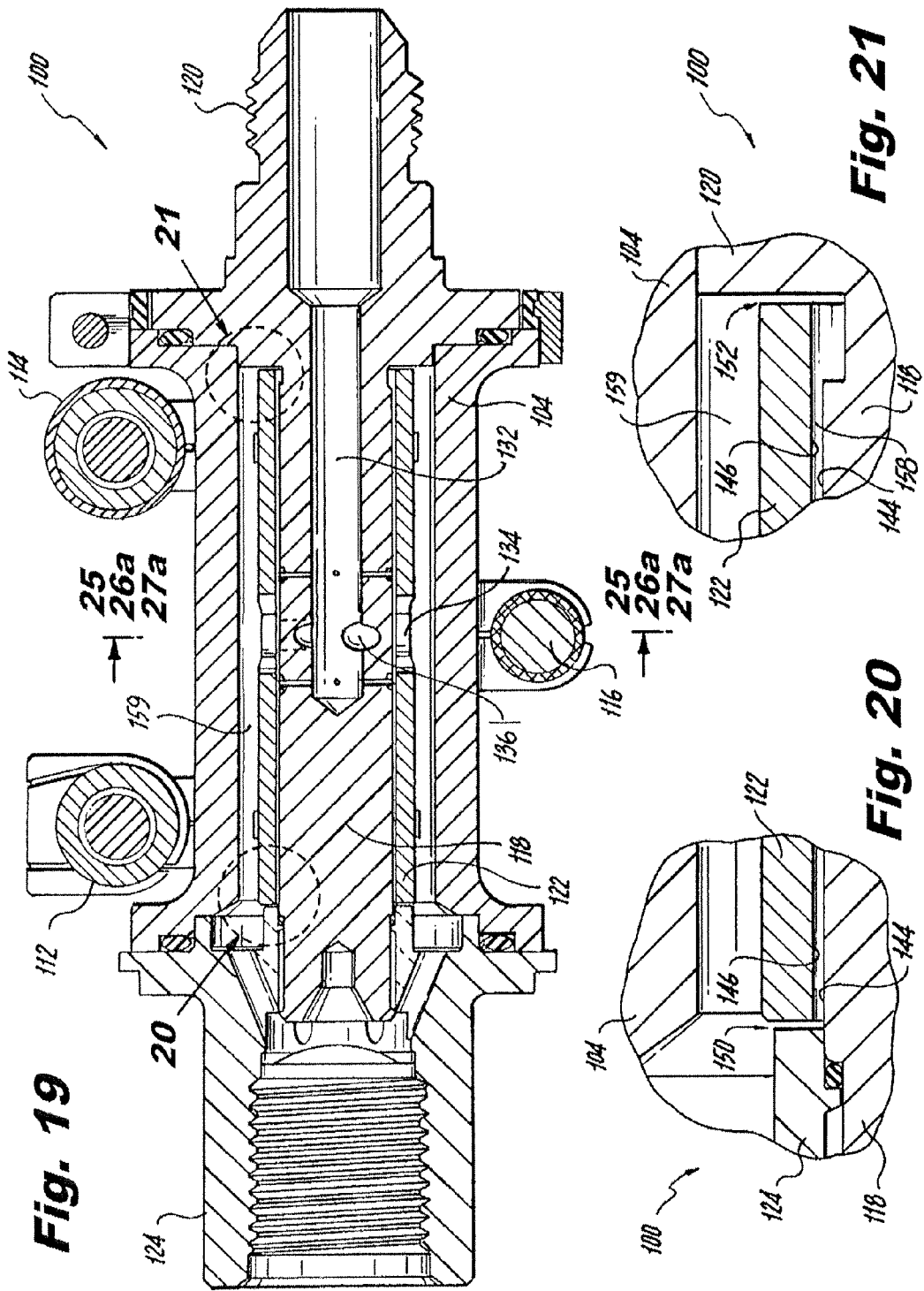

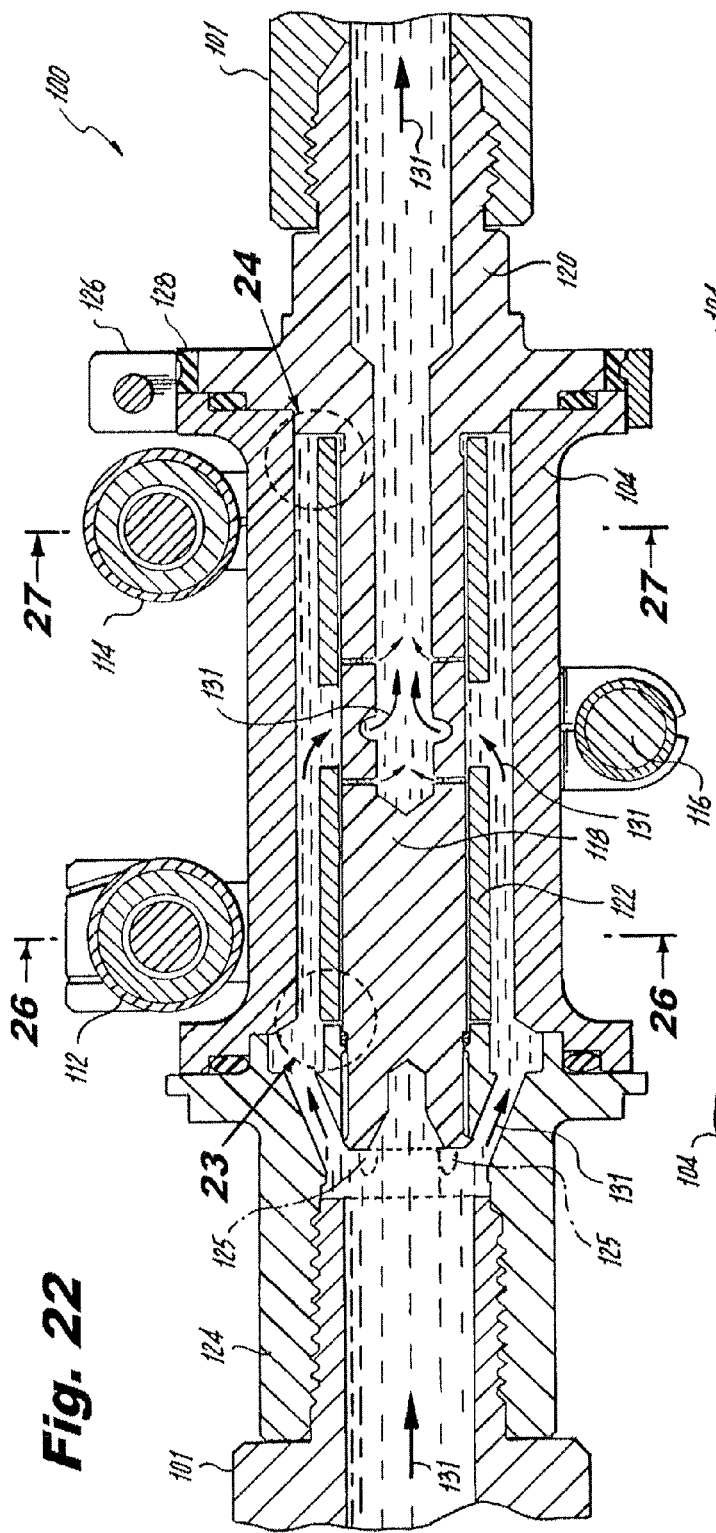
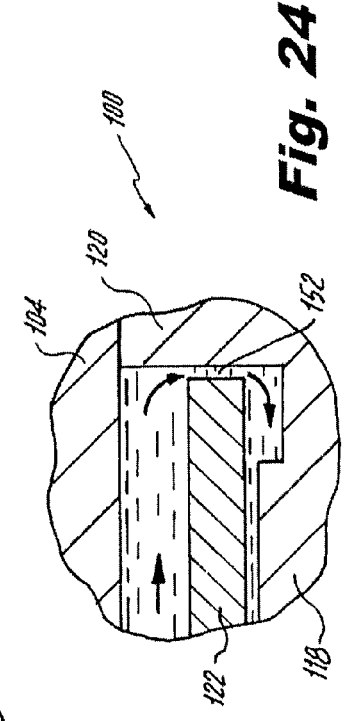
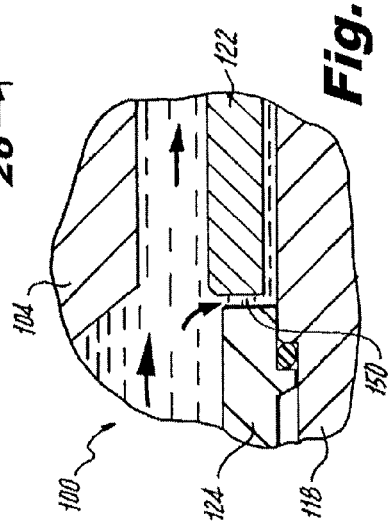
Fig. 22
Fig. 23
Fig. 24

TRIM VALVES FOR MODULATING FLUID FLOW

BACKGROUND OF THE INVENTION

1. Field of the Invention

The present invention relates to valves for modulating fluid flow, and more particularly to trim valves for modulating fuel flow in gas turbine engines.

2. Description of Related Art

A variety of devices and methods are known in the art for regulating fluid flow. For example, there have been many devices for regulating fuel flow in fuel injectors and nozzles during operation of gas turbine engines. Of such devices, many are directed to manifolds, valves, and check valves for regulating fuel flow through injectors and nozzles in an effort to maintain even flow distribution among multiple fuel injectors.

During operation of typical gas-turbine engines, fuel is supplied at a set mass flow rate to a manifold by a fuel pump, which creates the pressure needed to simultaneously deliver the required mass flow rate to a plurality of fuel injectors. The fuel injectors are typically arranged in a circumferential pattern around the combustor of the engine. Due to manufacturing tolerances and material variations in the fuel injectors, the fuel flow from individual injectors can vary significantly from injector to injector even if the manifold and other engine components are functioning properly. In the past, this problem has been addressed by tightening manufacturing tolerances for engine components and particularly for the injectors. There are practical limitations to this approach. Additionally, regardless of how tight the manufacturing tolerances are, uneven flow can result from variations in wear from injector to injector over the lifetime of the injectors.

The effect of variations from injector to injector due to uneven wear, manufacturing tolerances, and other factors can cause significant maldistribution of fuel flow from one injector to the next. This uneven distribution of fuel can create difficulties in operating and maintaining gas turbine engines, such as poor fuel performance, elevated emission of pollutants, and combustor stress due to temperature gradients, i.e. hot spots and cold spots, around the combustor.

The conventional methods and systems described above have generally been considered satisfactory for their intended purposes. However, there still remains a continued need in the art for devices and methods that allow for improved flow distribution among multiple fuel injectors. There also remains a need in the art for such methods and devices that are easy to make and use. The present invention provides a solution to these problems.

SUMMARY OF THE INVENTION

The subject invention is directed to a new and useful trim valve for modulating fuel flow in a gas turbine engine. The trim valve includes a valve housing having an inlet section and an outlet section and defining a longitudinal axis. A valve shaft is aligned with the longitudinal axis and mounted to the valve housing to be stationary with respect thereto. The valve shaft includes an internal flow passage in fluid communication with the outlet section of the valve housing. A valve rotor is disposed inboard of the valve housing and outboard of the valve shaft for modulating fuel flow through the valve housing. The valve rotor is mounted for rotational movement within the valve housing between a fully open position in which a flow path is defined between the inlet and outlet sections of the valve housing, and a reduced flow position in which the valve rotor at least partially blocks the flow path. An actuator is operatively connected to the valve housing to actuate the valve rotor between the fully open and reduced flow positions to trim flow through the flow path.

In accordance with certain embodiments, a rotor port is defined through the valve rotor for fluid communication between a space external to the valve rotor and a space internal to the valve rotor, and a shaft port is defined through the valve shaft for fluid communication between a space external to the valve shaft and the internal flow passage of the valve shaft. The rotor port and the shaft port are substantially aligned together with respect to the longitudinal axis of the valve housing. In the fully open position of the valve rotor, the rotor port and shaft port are substantially aligned circumferentially together and the flow path is defined from the inlet section of the valve housing, through the rotor port, through the shaft port, to the outlet section of the valve housing. In the reduced flow position of the valve rotor, the rotor port and shaft port are out of alignment circumferentially to reduce flow along the flow path. In intermediate positions between the fully open and reduced flow positions, the valve rotor partially occludes the shaft port to trim fuel flow along the flow path.

In the fully open position of the valve rotor, the rotor port and shaft port can be substantially aligned together circumferentially to form a common aperture of a first size with the flow path defined from the inlet section of the valve housing, through the common aperture, to the outlet of the valve housing. In the reduced flow position of the valve rotor, the rotor port and shaft port can be out of alignment to at least partially occlude the common aperture to a second size and thereby reduce flow along the flow path. In intermediate positions between the fully open and reduced flow positions, the common aperture can be sized between the first and second sizes to trim fuel flow along the flow path.

It is contemplated that a fluid bearing can be formed between bearing surfaces of the valve shaft and the valve rotor. The bearing surface of the valve shaft can be faceted or grooved, can have differential diameters, or can be of any other suitable configuration.

In certain embodiments, the valve rotor includes a first pair of radially opposed rotor wings formed of a magnetic flux permeable material. The actuator includes a first electromagnet operatively connected to the valve housing to form a first magnetic flux circuit that includes the first pair of rotor wings and is configured to urge the valve rotor in a direction towards one of the fully open or reduced flow positions with an applied current to the first electromagnet. The valve rotor can include a second pair of opposed rotor wings spaced axially apart from the first pair of rotor wings and formed of a magnetic flux permeable material. The actuator can include a second electromagnet operatively connected to the valve housing to form a second magnetic flux circuit that includes the second pair of rotor wings and is configured to urge the valve rotor in a direction opposite that of the first magnetic flux circuit with an applied current to the second electromagnet.

It is also contemplated that the valve rotor can include a third pair of opposed rotor wings formed from a magnetic flux permeable material. The actuator can include a permanent magnet forming a third magnetic flux circuit that includes the third pair of rotor wings for urging the valve rotor to a neutral position between the fully open and reduced flow positions.

The invention also provides a method of modulating fuel distribution to injectors in a gas turbine engine. The method includes the step of magnetically actuating at least one trim valve of a plurality of trim valves in response to sensing an uneven flow distribution among a plurality of injectors in a gas turbine engine to adjust, fuel flow to at least one individual injector to provide a more even flow distribution among the plurality of injectors. Each trim valve is fluidly connected in series with a separate injector.

The step of actuating can include changing an applied current to an electromagnet of any one of the trim valves as needed to actuate a valve rotor thereof to increase flow to an insufficiently flowing injector corresponding thereto. The step of actuating can also include changing an applied current to an electromagnet of any one of the trim valves as needed to actuate a valve rotor thereof to decrease flow to an excessively flowing injector corresponding thereto. The method can further include a step of actuating each of the flow trim valves with a respective permanent magnet thereof to a neutral flow condition in the absence of a current applied to electromagnets for actuating the flow trim valves to increased or decreased flow conditions.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 19 is a cross-sectional side elevation view of the trim valve of FIG. 1, showing the gaps at the end of the valve rotor for allowing fluid flow into the fluid bearing space;

FIG. 20 is a cross-sectional side elevation view of a portion of the trim valve of FIG. 1, showing the gap at the end of the valve rotor at the location indicated in FIG. 19;

FIG. 21 is a cross-sectional side elevation view of a portion of the trim valve of FIG. 1, showing the gap at the end of the valve rotor at the location indicated in FIG. 19;

FIG. 22 is a cross-sectional side elevation view of the trim valve of FIG. 1, showing the main flow path through the trim valve;

FIG. 23 is a cross-sectional side elevation view of a portion of the trim valve of FIG. 1, showing the flow path into the gap at the end of the valve rotor at the location indicated in FIG. 22;

FIG. 24 is a cross-sectional side elevation view of a portion of the trim valve of FIG. 1, showing the flow path into the gap at the end of the valve rotor at the location indicated in FIG. 22;

DETAILED DESCRIPTION OF THE PREFERRED EMBODIMENTS

Figure 1:
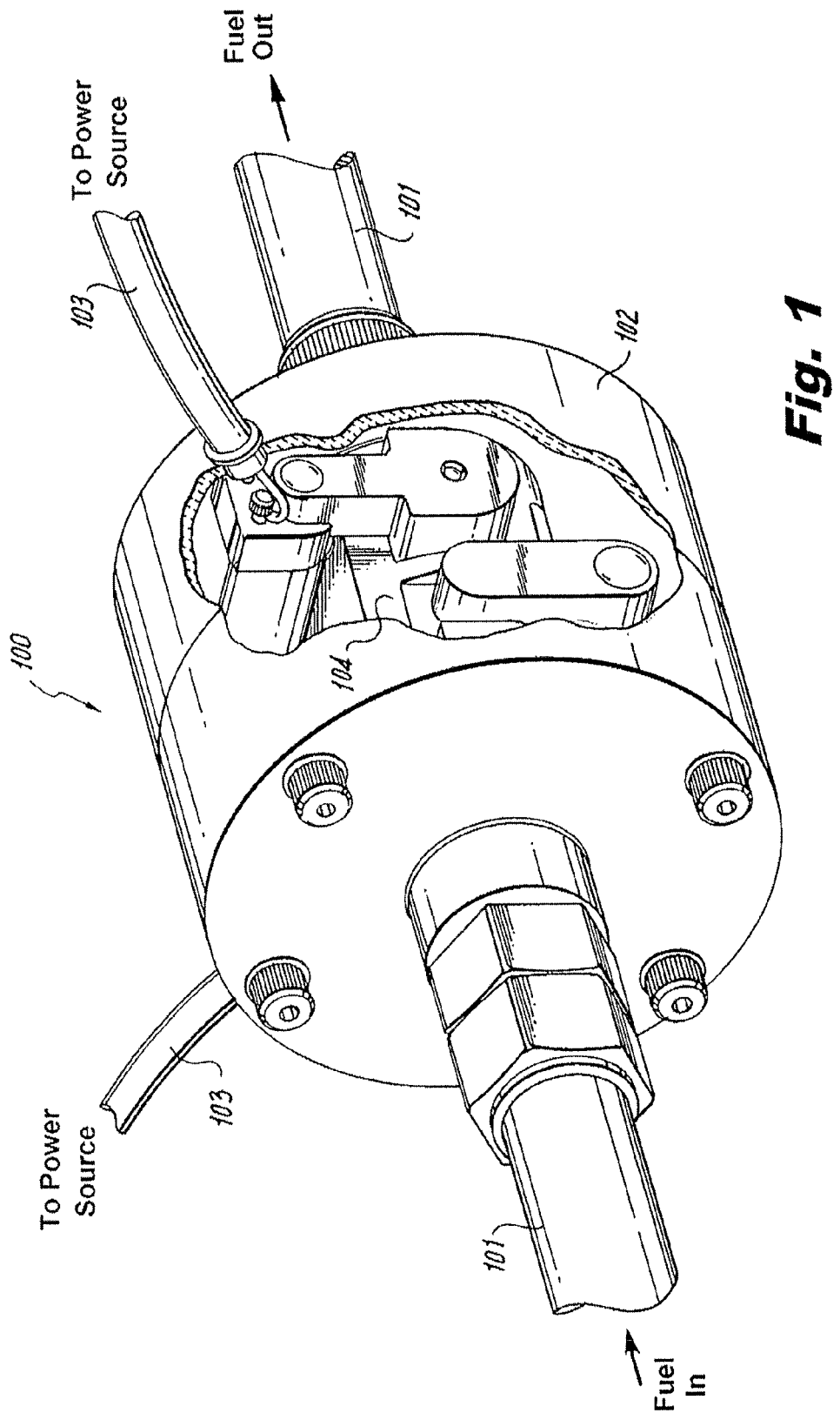
FIG. 1 is a perspective view of a portion of an exemplary embodiment of a trim valve constructed in accordance with the present invention, schematically indicating inflow and outflow to and from the valve housing.

Reference will now be made to the drawings wherein like reference numerals identify similar structural features or aspects of the subject invention. For purposes of explanation and illustration, and not limitation, a partial view of an exemplary embodiment of a trim valve constructed in accordance with the invention is shown in FIG. 1 and is designated generally by reference character 100. Other embodiments of trim valves in accordance with the invention, or aspects thereof, are provided in FIGS. 2-29, as will be described. The systems of the invention can be used, for example, to modulate fuel distribution to multiple fuel injectors in a gas turbine engine.

Trim valve 100 is shown fluidly connected to a conduit 101, such as a fuel line in a gas turbine engine. An outer casing 102 is provided to encapsulate trim valve 100 and accommodate conduit 101 and electrical leads 103 connected to trim valve 100. As indicated in FIG. 1, flow from a source such as a reservoir or fuel tank flows into trim valve 100 through conduit 101 and can selectively flow out of trim valve 100 through conduit 101 based on applied current from leads 103.

Figure 2:
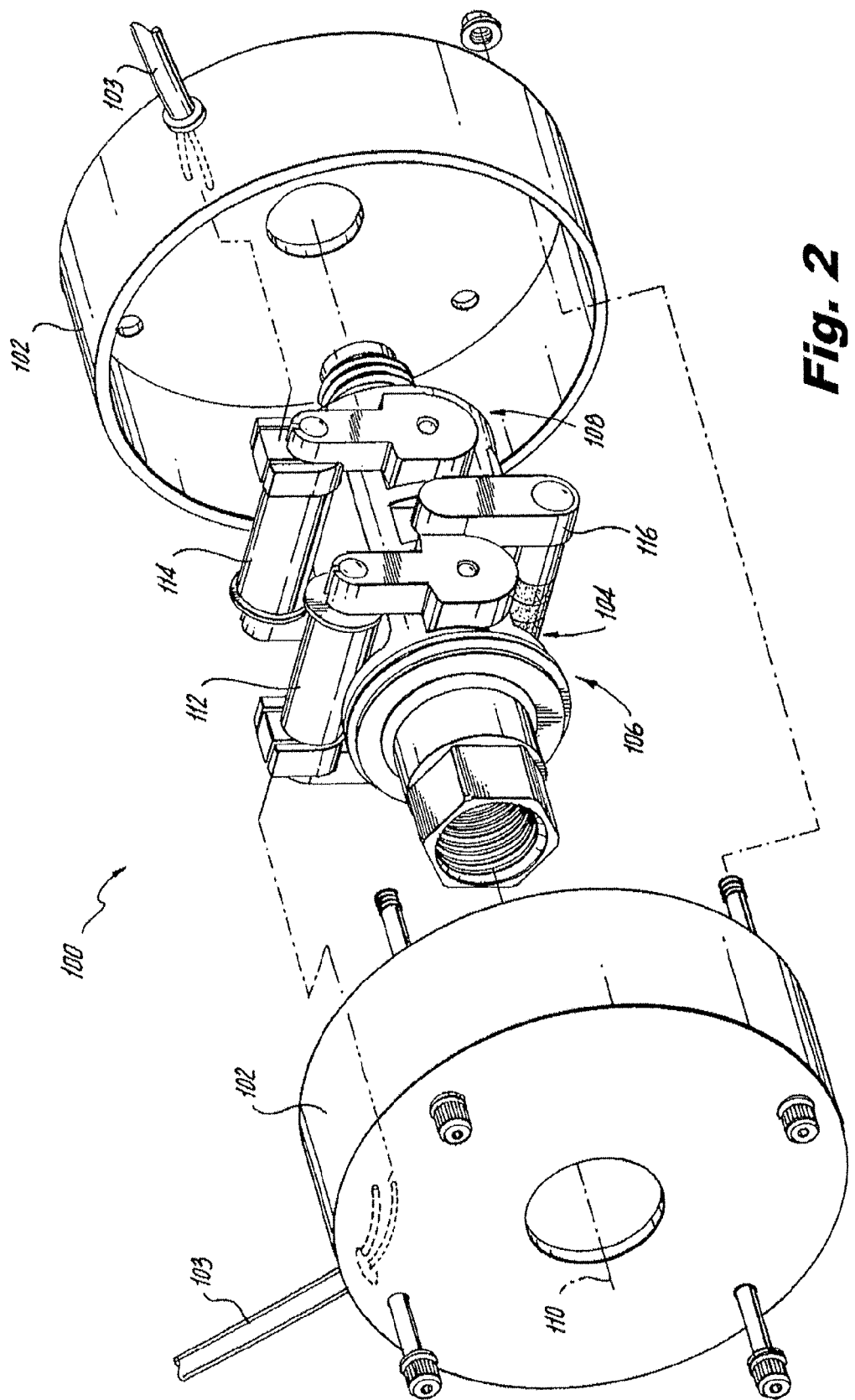
FIG. 2 is a perspective view of the trim valve of FIG. 1, showing the outer casing removed to reveal the valve housing.

Referring now to FIG. 2, trim valve 100 includes a valve housing 104 having an inlet section 106 and an outlet section 108 and defining a longitudinal axis 110. Two electromagnets are mounted on housing 104. The first electromagnet 112 is connected to an electrical lead 103 to form a magnetic clockwise circuit when a current is applied to the corresponding lead 103. The second electromagnet 114 is connected to an electrical lead 103 to form a magnetic counter clockwise circuit when a current is applied to the corresponding lead 103. A permanent magnet 116 is also mounted on housing 104 and forms part of a magnetic centering circuit. The operation of the magnetic circuits will be described in greater detail below.

Figure 3:
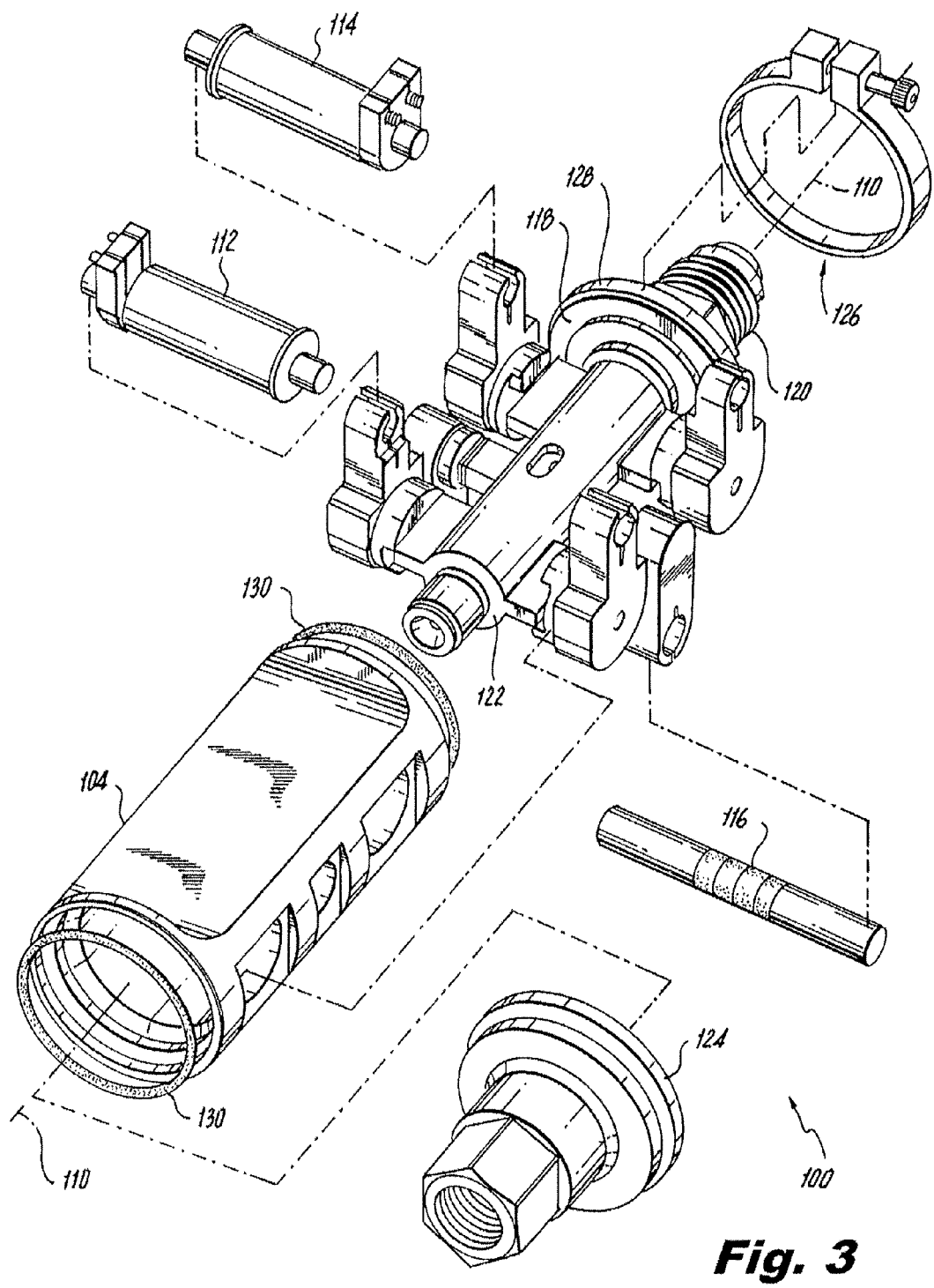
FIG. 3 is an exploded perspective view of the trim valve of FIG. 1, showing the valve housing and electromagnets removed to expose the valve rotor.

With reference now to FIG. 3, internal components of trim valve 100 are shown. Trim valve 100 includes a valve shaft 118 that is aligned with longitudinal axis 110 and is mounted to valve housing 104. Valve shaft 118 is stationary with respect to housing 104 and the outlet portion of valve shaft 118 forms outlet 120 of trim valve 100. Outlet 120 can therefore be considered to be part of outlet section 108 of valve housing 104. A ring clamp 126 and flange 128 are used to secure valve shaft 118 to housing 104 and allow for calibration of trim valve 100, as will be described in greater detail below. A valve rotor 122 is disposed inboard of valve housing 104 and outboard of valve shaft 118 for modulating fuel flow through valve housing 104. An inlet fitting 124 and accompanying o-ring 130 are provided for connecting housing 104 to conduit 101. Inlet fitting 124 includes diverging ports 125 for routing incoming fluid around the inlet end of valve shaft 118.

Figure 4:
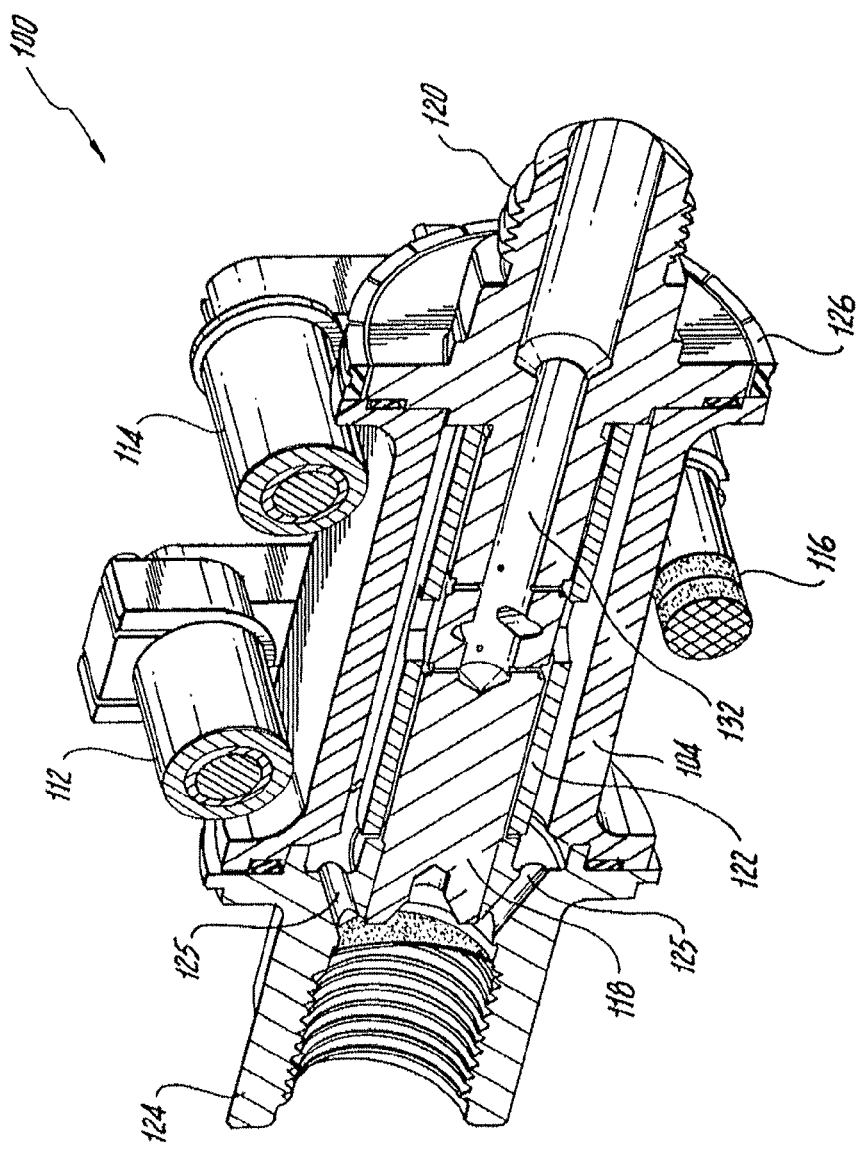
FIG. 4 is a cross-sectional perspective view of a portion of the trim valve of FIG. 1, showing the valve rotor mounted for rotational movement on the valve shaft, as viewed looking toward the outlet.
Figure 5:
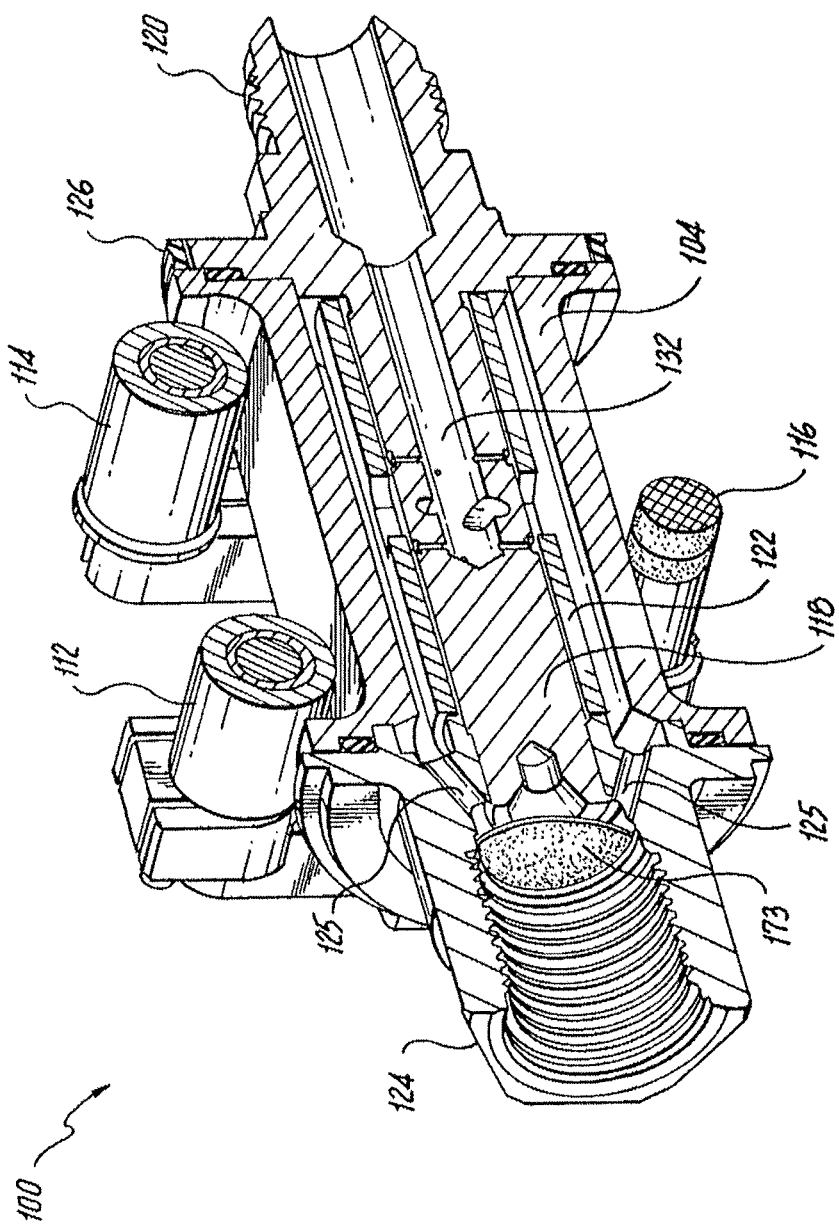
FIG. 5 is a perspective view of a portion of the trim valve of FIG. 1, showing the valve rotor mounted for rotational movement on the valve shaft, as viewed looking toward the inlet.

Referring now to FIGS. 4 and 5, valve shaft 118 includes an internal flow passage 132 in fluid communication with outlet 120. Valve rotor 122 is mounted for rotational movement within valve housing 104 between a fully open position in which a flow path is defined between the inlet and outlet sections 106 and 108 of valve housing 104, and a reduced flow position in which valve rotor 122 at least partially blocks the flow path. An actuator is operatively connected to valve housing 104 to actuate valve rotor 122 between the fully open and reduced flow positions to trim flow through the flow path. The actuator includes electromagnets 112 and 114. It is advantageous for housing 104 to have a low magnetic permeability to facilitate operation of the actuator. Suitable housing materials with low magnetic permeability include, 300 series stainless steels, Nitronic® 60 (available from National Specialty Alloys, Inc. of Houston, Tex.), or any other suitable material. A wire mesh 127 across the opening of inlet fitting 124 screens incoming fluid to stop particles from passing through trim valve 100.

Figure 6:
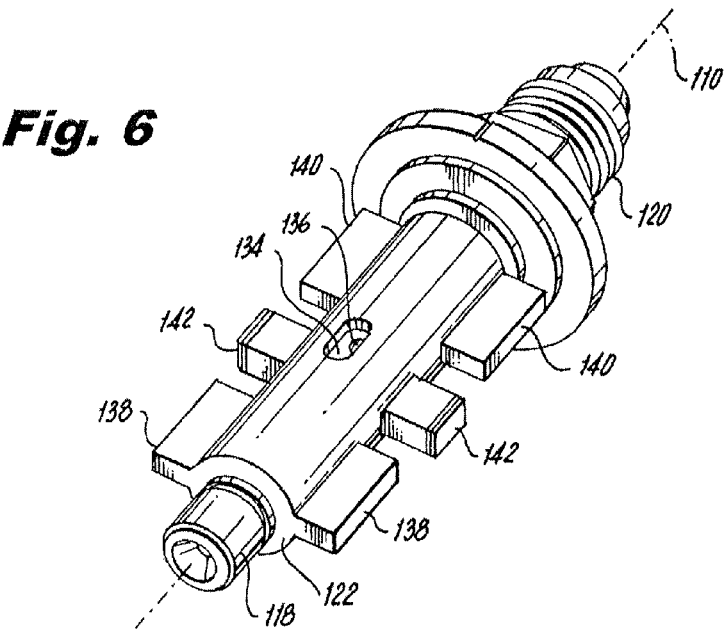
FIG. 6 is a perspective view of a portion of the trim valve of FIG. 1, showing the valve shaft and valve rotor removed from the valve housing to reveal the rotor port and shaft port.
Figure 7:
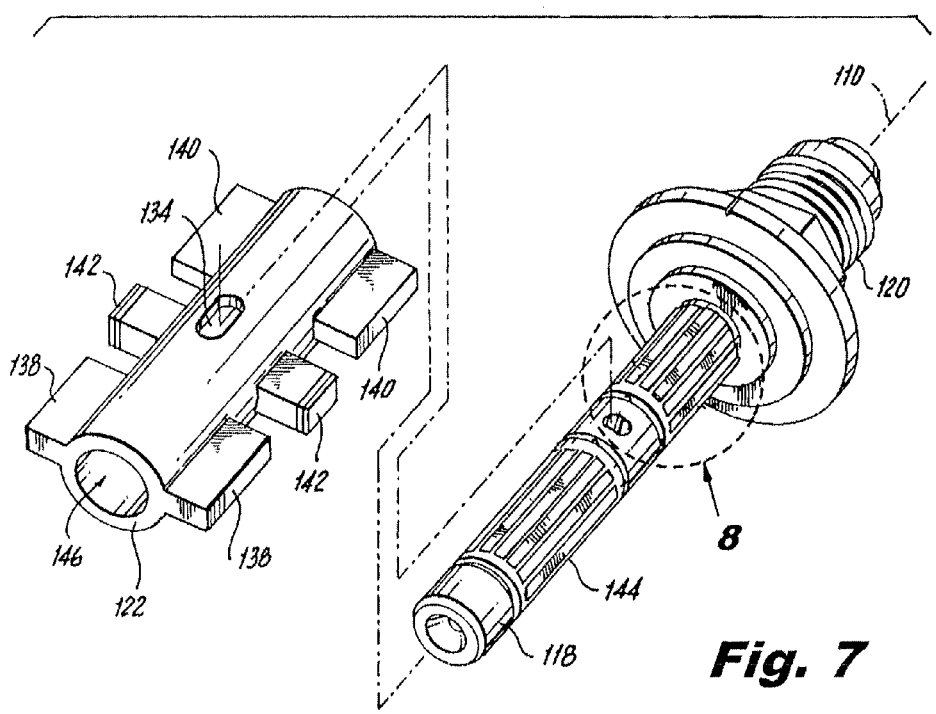
FIG. 7 is an exploded perspective view of the valve shaft and valve rotor of FIG. 6, showing the fluid bearing surfaces.

A rotor port 134 is defined through valve rotor 122 for fluid communication between a space external to valve rotor 122 and a space internal thereto, as shown in FIGS. 6-7. A shaft port 136 is defined through valve shaft 118 for fluid communication between a space external to valve shaft 118 and internal flow passage 132. Rotor port 134 and shaft port 136 are substantially aligned together axially along longitudinal axis 110, so that together ports 134 and 136 form a variable size aperture for trimming flow through the flow path of trim valve 100 depending on the rotational position of valve rotor 122.

With ongoing reference to FIGS. 6-7, valve rotor 122 includes a first pair of radially opposed rotor wings 138 formed of a magnetic flux permeable material. The first pair of rotor wings 138 forms part of the clockwise magnetic flux circuit that includes electromagnet 112. When a current is applied to electromagnet 112, the clockwise magnetic flux circuit urges valve rotor 122 in a direction towards the fully open position by increasing the size of the aperture formed by ports 134 and 136. This clockwise actuation is described in greater detail below with reference to FIGS. 26 and 26a.

Valve rotor 122 further includes a second pair of opposed rotor wings 140 spaced axially apart from the first pair of rotor wings 138 and formed of magnetic flux permeable material. The second pair of rotor wings 140 forms part of the counter clockwise magnetic flux circuit that includes electromagnet 114 of the actuator. When a current is applied to electromagnet 114, the counter clockwise magnetic flux circuit urges valve rotor 122 in a direction towards the reduced flow position. This counter clockwise actuation is described in greater detail below with reference to FIGS. 27 and 27a. Those skilled in the art will readily appreciate that a trim valve can be configured with the magnetic flux circuits reversed so that counter clockwise movement increases flow and clockwise movement decreases flow without departing from the spirit and scope of the invention.

Valve rotor 122 also includes a third pair of opposed rotor wings 142 formed from magnetic flux permeable material. The magnetic centering circuit includes the third pair of rotor wings 142 and urges valve rotor 122 to a neutral position that is between the fully open and reduced flow positions. Thus the magnetic centering circuit, including permanent magnet 116 and rotor wings 142, serves as a spring that urges against clockwise or counterclockwise movements of valve rotor 122. The spring force must be overcome by the actuator in order to rotate valve rotor 122 away from the neutral position, making it is possible to control the rotational position of valve rotor 122 with precision by controlling the applied current to one or the other of electromagnets 112 and 114. Additionally, if there is no current applied to electromagnets 112 and 114, then the magnetic centering circuit returns or maintains valve rotor 122 in the neutral position, providing for fluid flow in the event of a power failure. The magnetic centering circuit is described in greater detail below with reference to FIG. 25.

Figure 8:
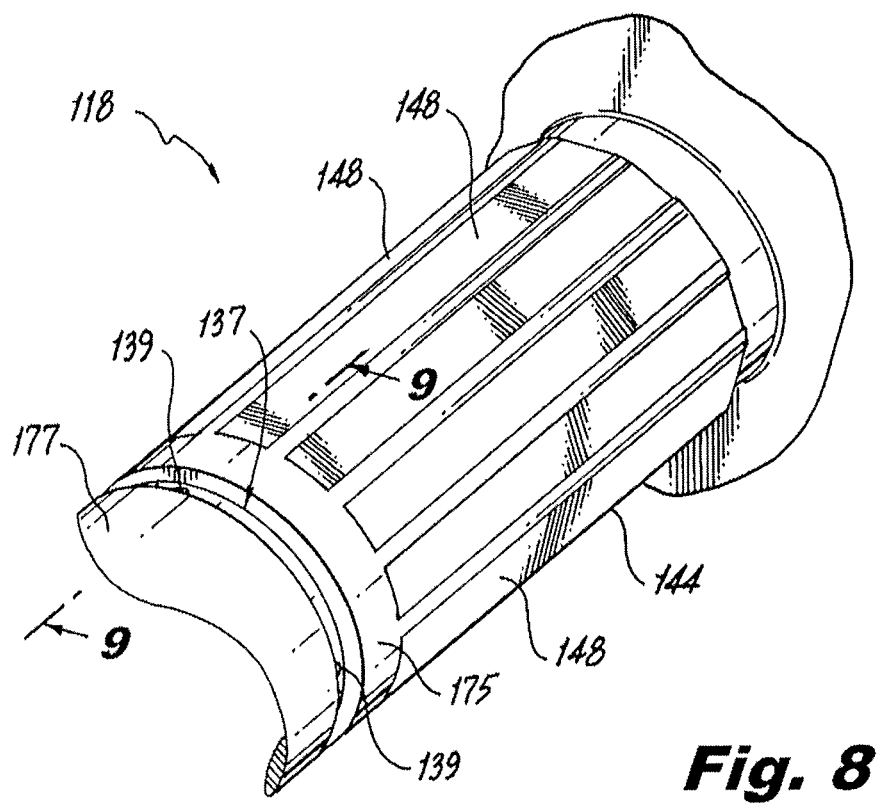
FIG. 8 is a perspective view of a portion of the valve shaft of FIG. 7, showing an enlargement the fluid bearing surface with facets.
Figure 9:
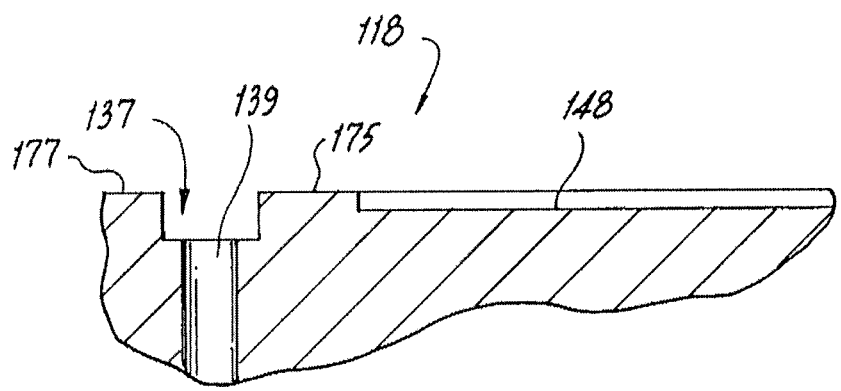
FIG. 9 is a cross-sectional side elevation view of a portion of the valve shaft of FIG. 8, showing the circumferential groove in the fluid bearing surface and one of the accompanying bores from the groove to the internal flow passage of the valve shaft.

Referring now to FIGS. 7-15, a fluid bearing is formed between a bearing surface 144 of valve shaft 118 and a bearing surface 146 of valve rotor 122. Bearing surface 144 of valve shaft 118 is faceted. FIG. 8 shows individual facets 148 of bearing surface 144 enlarged. It is also possible to use groves in lieu of facets. Groves 148 terminate centrally at throttling area 175. As shown in FIGS. 8-9, a circumferential groove 137 between throttling area 175 and central raised area 177 includes fluid bearing bores 139 into internal flow passage 132. There is a groove 137 on each end of raised area 177, and each groove 137 includes four fluid bearing bores 139 for a total of eight, however any suitable number of bores can be used. Throttling area 175, groove 137, and fluid bearing bores 139 function together with bearing surface 144 to create a fluid bearing, which is discussed in greater detail below.

Figure 10:
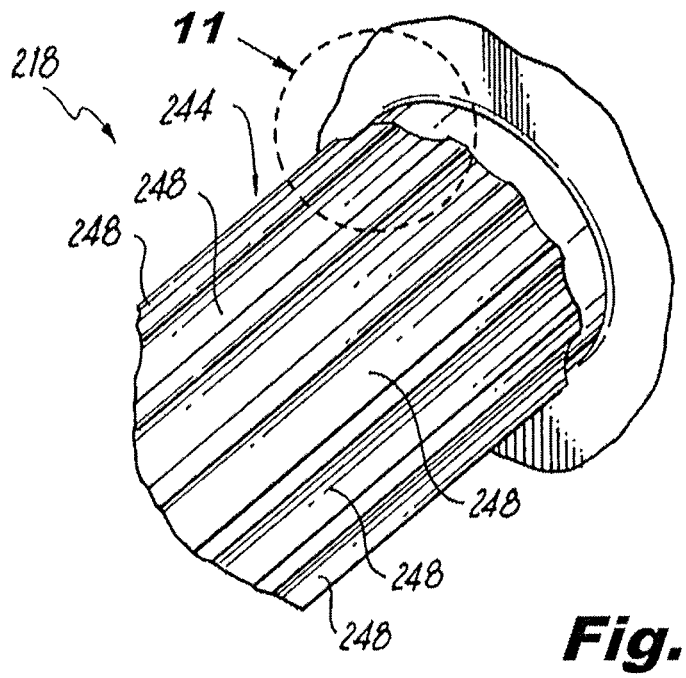
FIG. 10 is a perspective view of a portion another exemplary embodiment of a valve shaft constructed in accordance with the present invention, showing a bearing surface with grooves.
Figure 11:
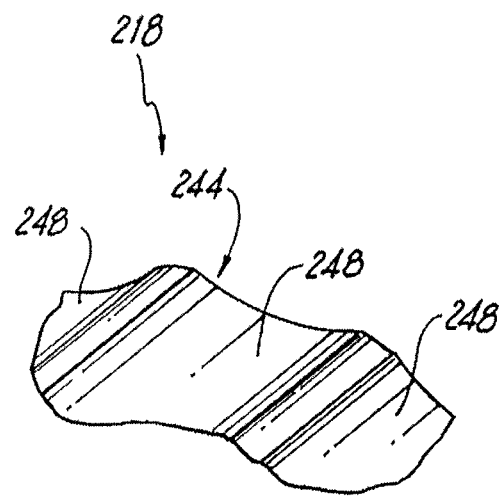
FIG. 11 is a perspective view of a portion of the valve shaft of FIG. 10, showing an enlargement of the grooves of the bearing surface.

FIGS. 10 and 11 show enlargements of another exemplary embodiment of a valve shaft 218 in which bearing surface 244 is fluted or grooved with grooves 248 instead of facets. The grooves shown in FIGS. 10 and 11 are exaggerated for clarity.

Figure 12:
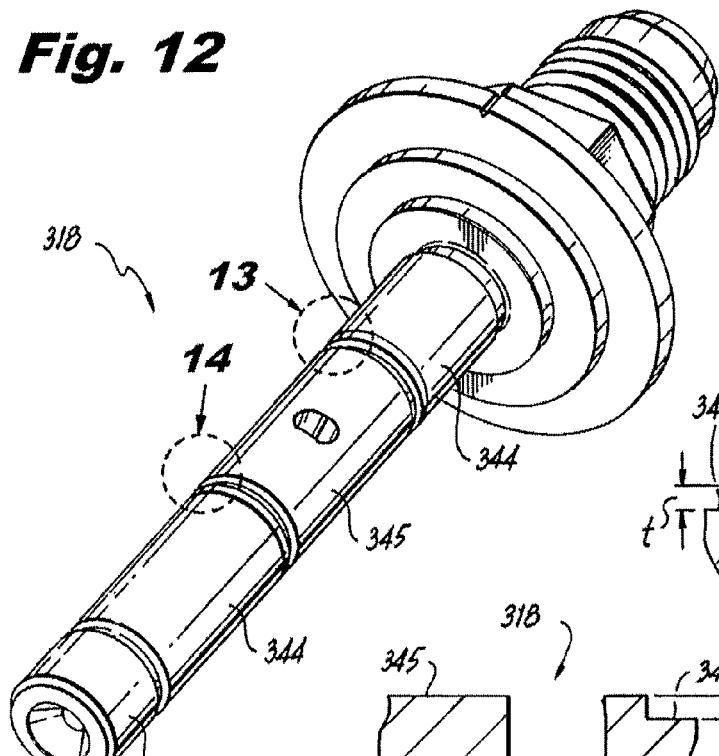
FIG. 12 is a perspective view of another exemplary embodiment of a valve shaft constructed in accordance with the invention, showing the bearing surface having differential diameters.
Figure 14:
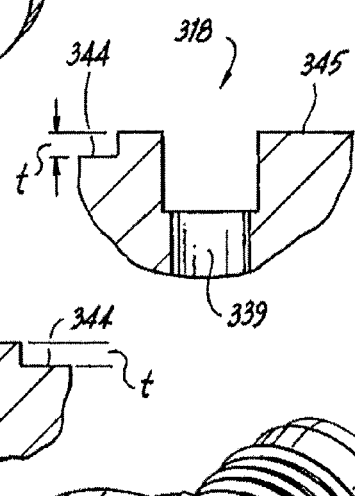
FIG. 14 is a cross-sectional side elevation view of a portion of the valve shaft of FIG. 12, showing the differential diameters at the location indicated in FIG. 12.
Figure 13:
FIG. 13 is a cross-sectional side elevation view of a portion of the valve shaft of FIG. 12, showing the differential diameters at the locations indicated in FIG. 12.
Figure 15:
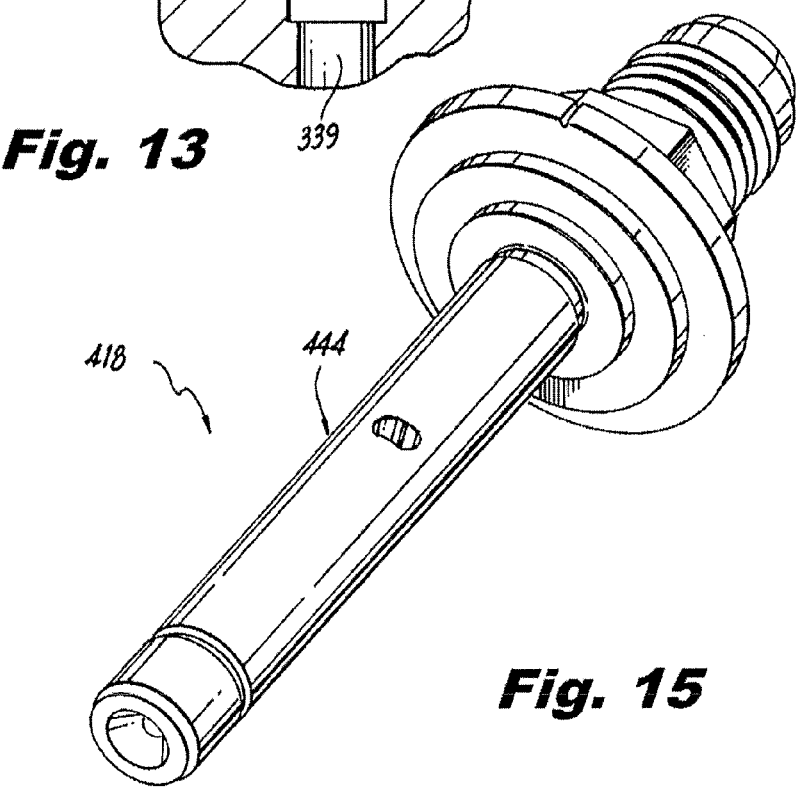
FIG. 15 is a perspective view of another exemplary embodiment of a valve shaft constructed in accordance with the invention, showing the smooth bearing surface.

With reference now to FIGS. 12-14, another exemplary embodiment of a valve shaft 318 is shown. Bearing surfaces 344 and 345 have differential diameters, meaning bearing surfaces 345 define a slightly larger diameter of valve shaft 318 than bearing surfaces 344. FIGS. 13 and 14 indicate this difference "t" in sizing between bearing surfaces 344 and 345 for the locations indicated in FIG. 12. FIGS. 13 and 14 also show fluid bearing bores 339 in the circumferential grooves of shaft 318, which serve the same purpose as fluid bearing bores 139 described above. Valve shaft 118 also has similar differential diameters, however, bearing surfaces 344 of valve shaft 318 are not faceted as in valve shaft 118. It is also possible to have a valve shaft without faceting, grooves, or differential diameters in the bearing surfaces. FIG. 15 shows an exemplary embodiment of a valve shaft 418 that has a smooth bearing surface 444.

Figure 16:
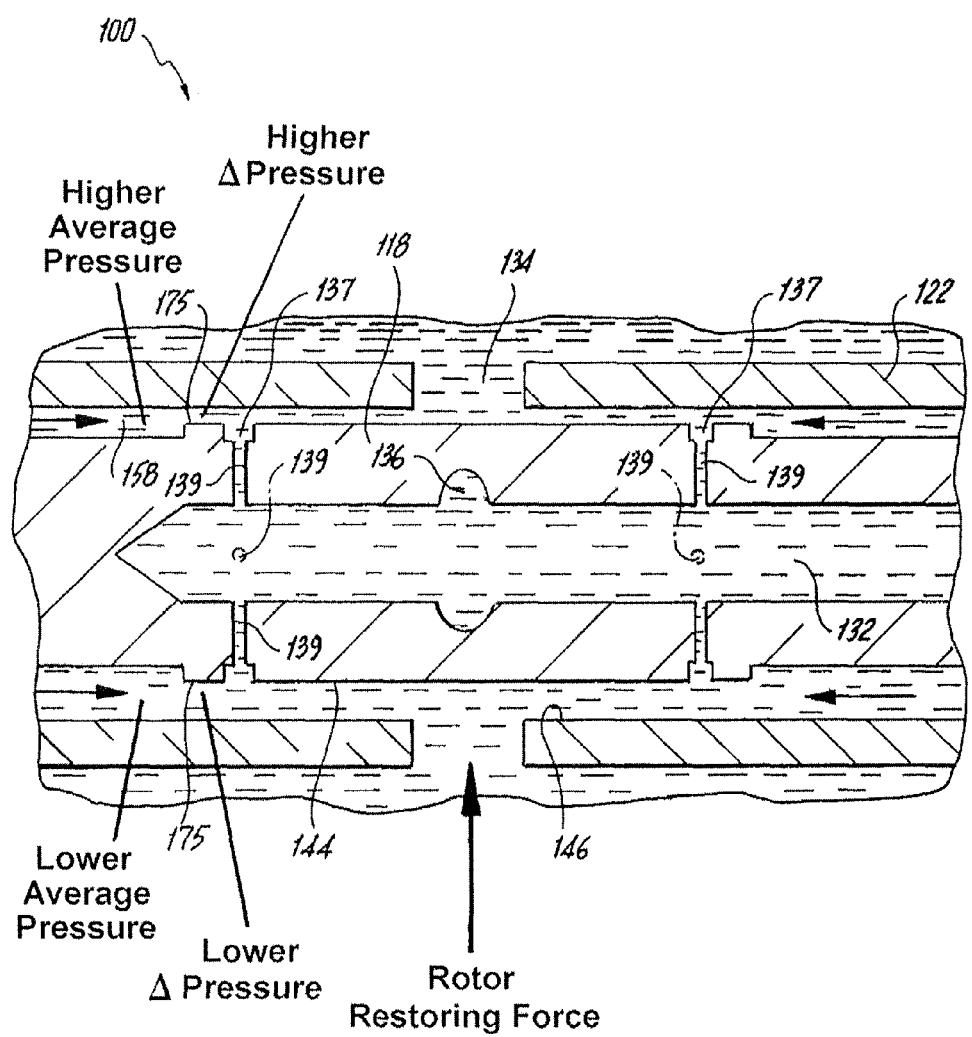
FIG. 16 is a schematic cross-sectional side elevation view of the trim valve of FIG. 1, showing the mechanics of the rotor restoring force.

Referring to FIG. 16, the mechanics of the rotor restoring force of the bearing surfaces 144 and 146 of trim valve 100 are shown schematically. The gap between bearing surfaces 144 and 146 is exaggerated in FIG. 16 to demonstrate the operation of the rotor restoring force. Fluid enters the fluid bearing space 158 between bearing surfaces 144 and 146, as shown in FIGS. 22-24, and flows from the inlet and outlet ends of valve rotor 122 toward fluid bearing bores 139 and shaft port 136, as indicated by flow arrows in FIG. 16. The fluid flowing through the fluid bearing space 158 is the same fluid being trimmed by passing through trim valve 100. For example, if trim valve 100 is used to trim fuel, fuel flows in fluid bearing space 158. As depicted in FIG. 16, if valve rotor 122 is moved off center, an opposing rotor restoring force results to return valve rotor 122 to a position centered over valve shaft 118. In FIG. 16, valve rotor 122 is shown displaced downward with respect to its normal position, with the rotor restoring force acting upwards, as indicted by the labeled force arrow.

Viscous effects in the fluid flowing through fluid bearing space 158 give rise to the rotor restoring force. Total pressure drop from the areas shown in FIGS. 20 and 21 to internal flow passage 132 of valve shaft 118 is the same regardless of lateral displacement of rotor 122 with respect to shaft 118. When valve rotor 122 moves closer to one side of valve shaft 118 than to the other side, as in FIG. 16, where the top of valve rotor 122 is closer than normal to valve shaft 118, there is an increase in average pressure in the top of fluid bearing space 158 due to the increased pressure drop across throttling area 175 (also shown in FIG. 9). On the opposite side of fluid bearing space 158, which in FIG. 16 is on the bottom, the fluid in fluid bearing space 158 has a decreased average pressure by comparison, due to the decreased pressure drop across the bottom throttling area 175. The pressure differential between widened and constricted portions of fluid bearing space 158 acts on bearing surface 146 of valve rotor 122, resulting in the indicated rotor restoring force. Since the rotor restoring force can arise in any radial direction to counter any off-center displacement of valve rotor 122, valve rotor 122 tends to stay centered around valve shaft 118 as long as fluid is flowing through fluid bearing space 158.

Figure 17:
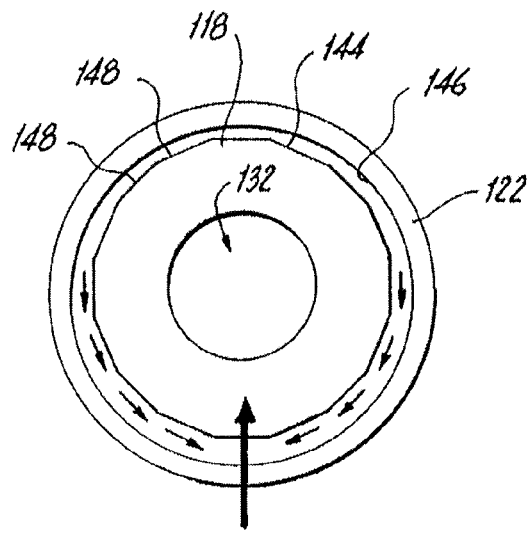
FIG. 17 is a schematic cross-sectional inlet end view of the trim valve of FIG. 16, showing the high and low pressure regions of the fluid bearing with circumferential leakage inhibited by the facets of the bearing surface on the valve shaft.
Figure 18:
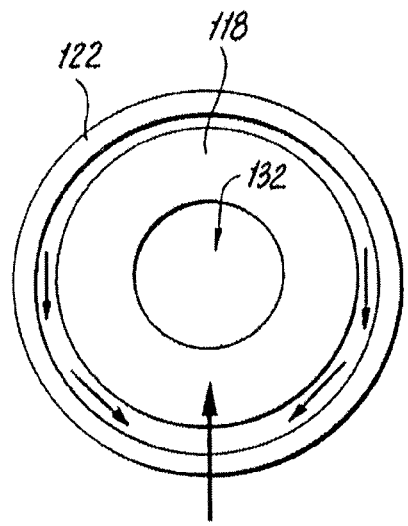
FIG. 18 is a schematic cross-sectional inlet end view of a portion of an exemplary embodiment of a trim valve constructed in accordance with the invention, showing the high and low pressure regions of the fluid bearing with circumferential leakage around the smooth differential diameter bearing surface on the valve shaft.

Referring now to FIG. 17, an end view of the fluid bearing system of FIG. 16 is shown schematically. As described above, in FIG. 17 the position of valve rotor 122 is lower than normal with respect to valve shaft 118. The high pressure at the top and the low pressure at the bottom of fluid bearing space 158, as oriented in FIGS. 16-17, can cause a circumferential flow around fluid bearing space 158. This circumferential flow is indicated by flow arrows in FIG. 17. Circumferential flow tends to equalize the pressures between the narrow and wide portions of fluid bearing space 158, and if the circumferential flow is too great it can diminish the rotor restoring force. Facets 148, only some of which are labeled in FIG. 17 for clarity, in bearing surface 144 of valve shaft 118 inhibit circumferential flow in fluid bearing space 158. Facets 148 therefore serve to enhance the rotor restoring force. By comparison, FIG. 18 shows a similar view to that shown in FIG. 17, but for differential diameter valve shaft 318 that is not faceted. The rotor restoring force is weaker in the configuration of FIG. 18 than that of FIG. 17 because there are no facets, grooves, or other discontinuities to inhibit circumferential flow in the fluid bearing space. In short, the greater the potential for circumferential flow, the weaker the rotor restoring force and vice versa. This principle is demonstrated by the relative sizing of the flow and force arrows in FIGS. 17-18.

FIGS. 19-21 show end gaps 150 and 152 where fluid enters fluid bearing space 158 on either end of valve rotor 122. At the inlet end, fluid can enter fluid bearing space 158 between bearing surfaces 144 and 146 by passing from inlet fitting 124 through gap 150 between inlet fitting 124 and valve rotor 122. On the outlet end, fluid can enter fluid bearing space 158 from flow area 159 between housing 104 and valve rotor 122 through gap 152 between outlet 120 of valve shaft 118 and valve rotor 122. FIGS. 19-21 show trim valve 100 in a dry condition, i.e., without fluid flowing therethrough.

FIGS. 22-24 show the same views as FIGS. 19-21, respectively, but with fluid flowing through the main flow path of trim valve 100 as well as through gaps 150 and 152 and fluid bearing space 158. A main flow path 131, indicated by flow arrows in FIG. 22, is defined from conduit 101 through diverging ports 125 of inlet fitting 124, through rotor and shaft ports 134 and 136, to outlet 120. The restoring force described above will be available as long as trim valve 100 is pressurized with fluid, i.e., as long as incoming fluid in inlet fitting 124 is at a high pressure relative to outgoing fluid in outlet 120, regardless of the relative rotation of valve rotor 122 with respect to valve shaft 118. Thus, even if valve rotor 122 is rotated to a fully closed position, occluding the variable aperture formed by ports 134 and 136, as long as the fluid in trim valve 100 is pressurized, leakage through gaps 150 and 152 and fluid bearing space 158 will float valve rotor 122 and allow low friction rotation thereof.

Figure 25:
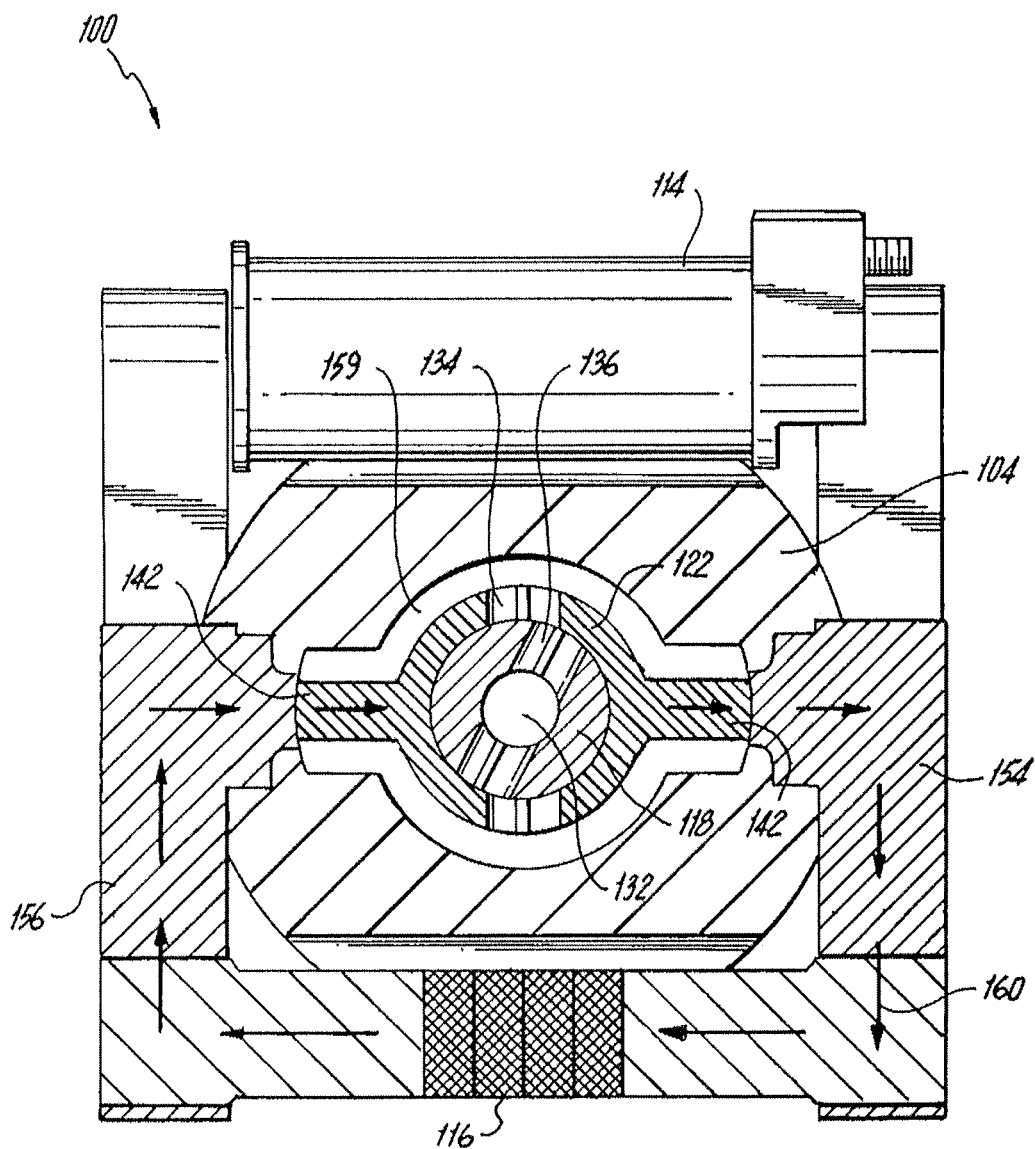
FIG. 25 is a cross-sectional inlet end view of the trim valve of FIG. 1, showing the magnetic path through the valve rotor and magnetic poles of the magnetic centering circuit with the valve rotor in the neutral position.

Referring now to FIG. 25, the operation of trim valve 100 will be described in greater detail. Permanent magnet 116 is mounted to housing 104 by means of poles 154 and 156.

Permanent magnet 116 is made of Alnico, and poles 154 and 156 are made of 430 stainless steel, however any other materials with suitable magnetic properties can be used. A magnetic centering circuit 160, indicated by arrows in FIG. 25, is formed through magnet 116, poles 154 and 156, and through valve rotor 122, including wings 142. Circuit 160 provides a magnetic force that urges valve rotor 122 to the neutral position shown in FIG. 25. In the neutral position, rotor port 134 is vertical, as oriented in FIG. 25. Stationary shaft port 136 is oriented at an angle just clockwise from vertical. The common aperture through ports 134 and 136 is about half as wide as shaft port 136. The neutral position provides a nominal flow rate through trim valve 100 that can be trimmed to either a higher or a lower flow rate as described below. Using a permanent magnet, as opposed to an ordinary spring for example, provides near frictionless motion. Ordinary spring connections between rotating and stationary parts introduce friction. Additionally, ordinary springs can fail, in which case rotor 122 would not be returned to the neutral position in a power failure.

Figure 26:
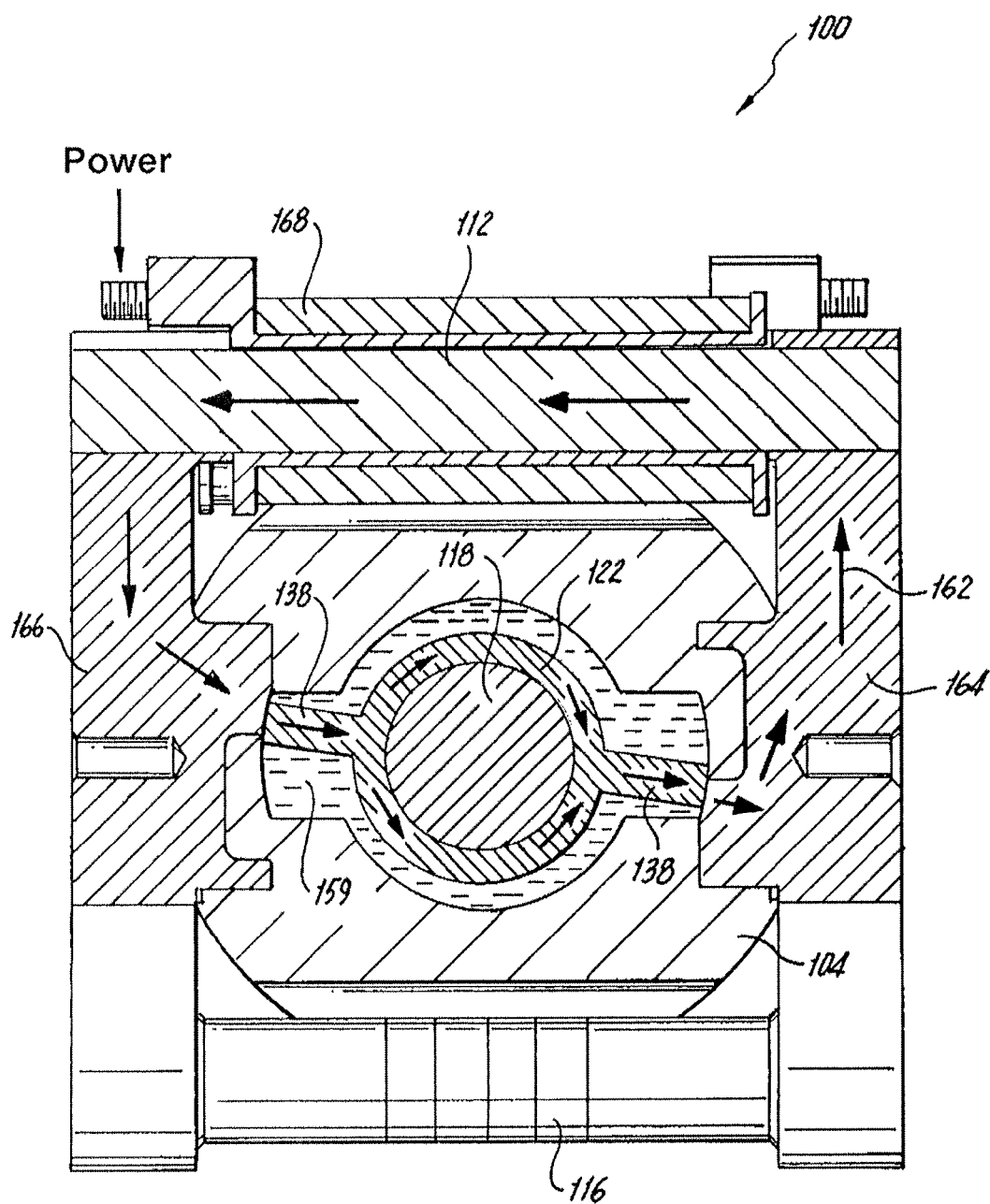
FIG. 26 is a cross-sectional inlet end view of the trim valve of FIG. 1, showing the magnetic path through the valve rotor and magnetic poles of the magnetic clockwise circuit with the valve rotor in the fully open position.
Figure 26A:
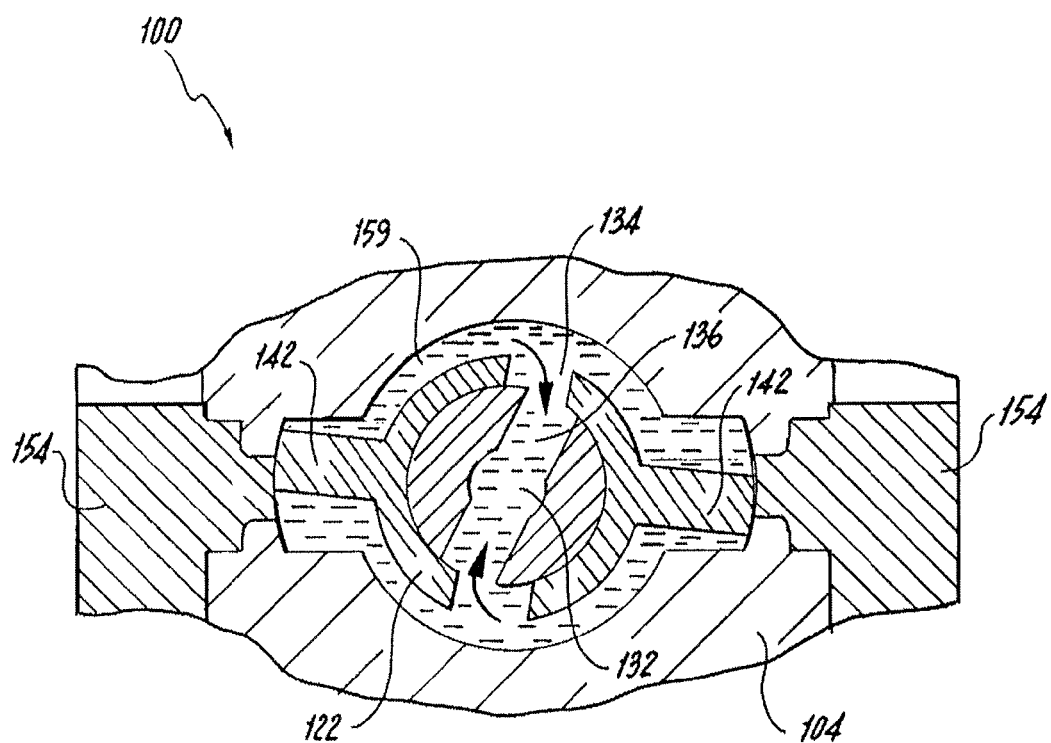
FIG. 26a is a cross-sectional inlet end view of a portion of the trim valve of FIG. 1, showing the cross-section indicated in FIG. 19 of the valve and rotor ports with the valve rotor in the fully open position.

With reference now to FIGS. 26 and 26a, clockwise magnetic flux circuit 162 is indicated by arrows. Circuit 162 is a closed magnetic flux loop that includes electromagnet 112, which is mounted to housing 104 by means of magnetic poles 164 and 166, which are made of 430 stainless steel or any other suitable material. Electromagnet 112, magnetic poles 164 and 166, and valve rotor 122 including wings 138 form circuit 162. Application of a current across coil 168 of electromagnet 112 activate circuit 162, creating a tangential magnetic force on wings 138 that torques valve rotor 122 in a clockwise direction as oriented in FIG. 26. The clockwise urging force must overcome the centering force of circuit 160 described above, which acts as a spring with increased force resulting from increased displacement of valve rotor 122. Thus, the greater the current applied to coil 168, the greater is the rotation of valve rotor 122 in the clockwise direction. The opposition of circuits 160 and 162 allows for precise control of clockwise rotation of valve rotor 122 to specific positions between the neutral position shown in FIG. 25 and the fully open position shown in FIGS. 26 and 26a.

As indicated by arrows in FIG. 25, the magnetic flux circuits include valve rotor 122 itself, in addition to the pairs of wings 138, 140, and 142. This allows the magnetic flux circuits to flow through the wings and around the body of valve rotor 122. Valve rotor 122 and wings 138, 140, and 142 are advantageously formed integrally from a material high in magnetic permeability such as 430 stainless steel, cobalt steels such as Vacoflux 17® (available from VAC Sales USA LLC of Elizabethtown, Ky.), silicon iron, low carbon steel, or any other suitable material.

FIGS. 26 and 26a show the fully open position, where wings 142 bottom out on the interior of housing 104, since wings 142 are slightly thicker in the circumferential direction than wings 138 and 140. Wings 142 are thicker circumferentially than wings 138 and 140 because it is advantageous for wings 142 to have more angular travel, since wings 142 have to be effective during both clockwise and counter clockwise excursions. Wings 142 are also shorter axially than wings 138 and 140 to maintain the magnetic circuit cross-sectional areas in proper proportion.

FIG. 26a shows the orientation of ports 134 and 136 in the fully open position. Due to the clockwise rotation of valve rotor 122, rotor port 134 is brought into increased alignment circumferentially with stationary shaft port 136, increasing the common area between ports 134 and 136 and resulting in increased flow through trim valve 100 compared to the flow in the neutral position shown in FIG. 25. With rotor port 134 and shaft port 136 substantially aligned circumferentially together, as shown in FIG. 26a, main flow path 131, shown in FIG. 19, is in a fully open flow position. Those skilled in the art will readily appreciate that the fully open position can be set at any appropriate angle for a given application without departing from the spirit and scope of the invention.

Figure 27:
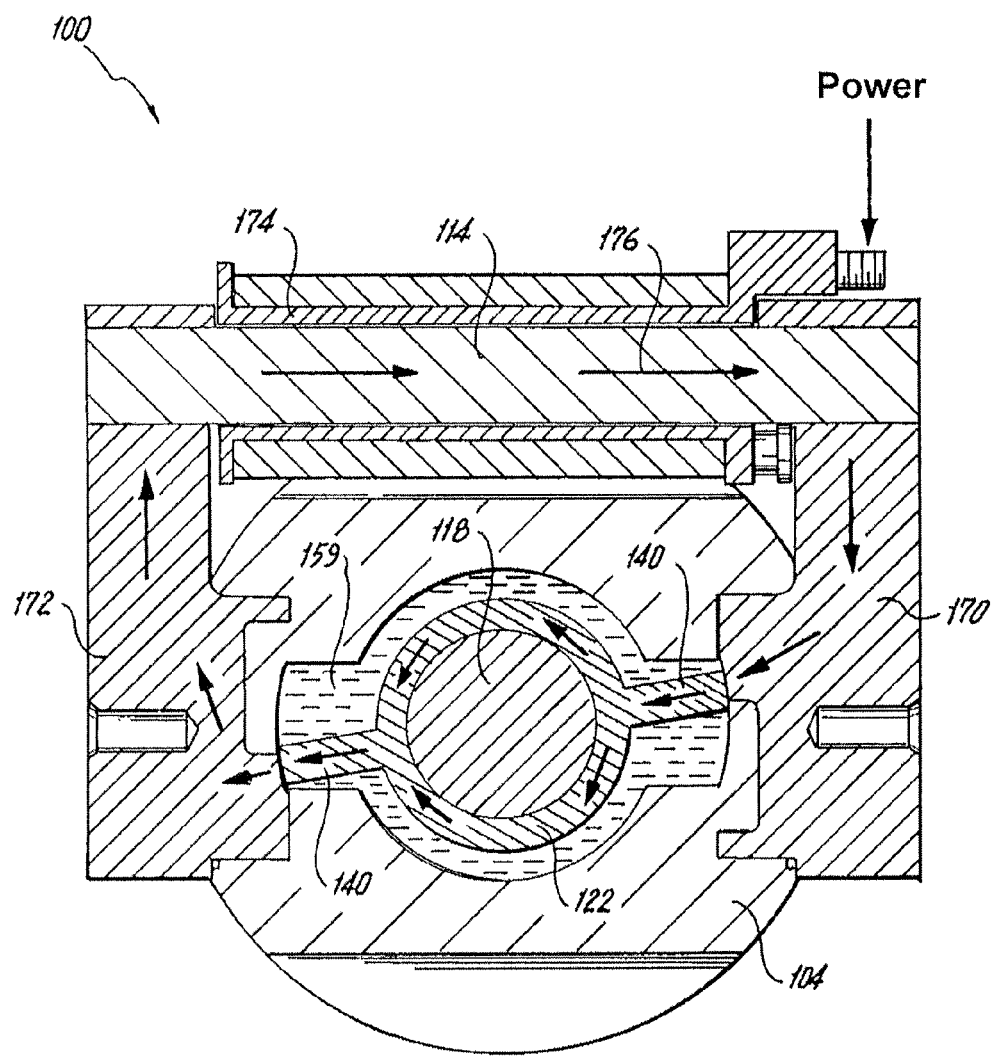
FIG. 27 is a cross-sectional inlet end view of the trim valve of FIG. 1, showing the magnetic path through the valve rotor and magnetic poles of the magnetic counter clockwise circuit with the valve rotor in the reduced flow position.
Figure 27A:
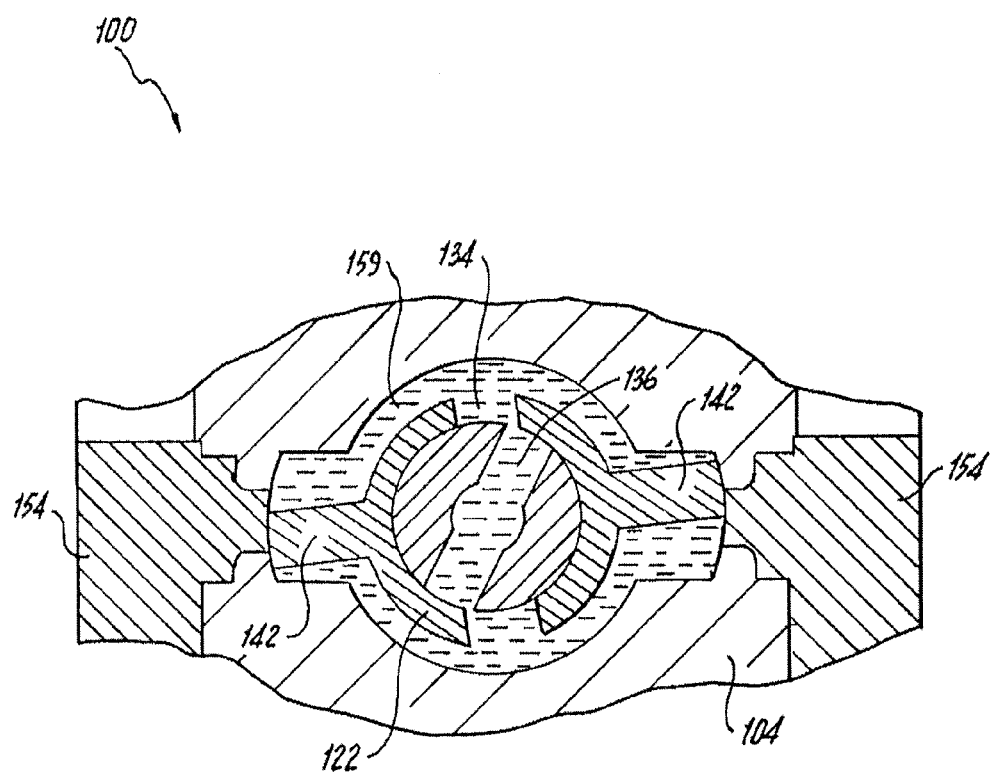
FIG. 27a is a cross-sectional inlet end view of a portion of the trim valve of FIG. 1, showing the cross-section indicated in FIG. 19 of the valve and rotor ports with the valve rotor in the reduced flow position.

Referring now to FIGS. 27 and 27a, a closed counter clockwise magnetic flux circuit 176 is depicted for decreasing flow through trim valve 100 relative to the flow in the neutral position shown in FIG. 25. Electromagnet 114 is mounted to housing 104 by means of magnetic poles 170 and 172, which can be made of 430 stainless steel or any other suitable material. Electromagnet 114, poles 170 and 172, and valve rotor 122 including wings 140 form circuit 176, as indicated by arrows in FIG. 27. Acting much like circuit 162 described above, but in the opposite direction, circuit 176 urges rotational movement of valve rotor 122 against the force of magnetic centering circuit 160, wherein the greater the current applied to coil 174, the greater the rotation is of valve rotor 122. FIGS. 27 and 27a show valve rotor 122 rotated in the maximum reduced flow position with wings 142 bottomed out in valve housing 104. In ordinary operation, the maximum clockwise and counter clockwise positions would not typically be reached, and the stops in housing 104 for wings 142 are provided to prevent rotor 122 from over-rotating or coming out of alignment with respect to the respective magnetic poles. Those skilled in the art will readily appreciate that the reduced flow position condition can be set at any appropriate angle for a given application without departing from the spirit and scope of the invention.

As indicated in FIG. 27a, with valve rotor 122 in the maximum counter clockwise position, rotor port 134 is brought into reduced circumferential alignment, or out of alignment, with stationary shaft port 136, decreasing or eliminating the common area between ports 134 and 136 and resulting in diminished flow through trim valve 100 compared to the flow in the neutral position shown in FIG. 25.

The three magnetic flux circuits described above are spaced out axially to reduce or prevent magnetic interaction from one circuit to another. Magnetic centering circuit 160 is in the center of the three circuits for symmetry. It is possible to use a single pair of wings that is part of all three magnetic flux circuits, however, having three separate pairs of wings increases the efficiency of the magnetic circuits.

As described above, even if main flow path 131 through ports 134 and 136 is closed off completely, there is still some flow or leakage through the fluid bearing as described above. This leakage is considered part of the nominal flow of trim valve 100. In the reduced flow position of valve rotor 122, rotor port 134 and shaft port 136 are less aligned or out of alignment circumferentially to reduce flow along flow main flow path 131 of FIG. 19. In intermediate positions between the fully open and reduced flow positions, valve rotor 122 partially occludes shaft port 136 to trim fuel flow along main flow path 131 to specific flow levels based on the specific current applied. Valve rotor 122 serves as an actuation component and as a valving component. Thus trim valve 100 can perform both trimming and actuating functions in a single device that with conventional devices would require at least two separate devices, namely an actuator and a valve controlled by the actuator. This provides trim valve 100 advantages in terms of compact form factor and weight.

As shown in FIGS. 25, 26a, and 27a, ports 134 and 136 are defined through the diameter of the respective rotor and shaft, so that there are two diametrically opposed rotor ports 134 and two diametrically opposed shaft ports 136. Those skilled in the art will appreciate that it is possible to have only one of each port. It is also possible to use any other suitable number of ports with any suitable angular separation on the shaft and rotor without departing from the spirit and scope of the invention. Moreover, the sizes of ports 134 and 136 can be adapted to suit specific applications, for example to accommodate a desired angular motion range of valve rotor 122.

While described above with exemplary clockwise and counter clockwise orientations, those skilled in the art will readily appreciate that the magnetic flux circuits configured as described above will operate in the same manner regardless of the direction of the magnetic flux in the respective circuits. Additionally, the clockwise and counter clockwise motion can be reversed by changing the angle of shaft port 136 without departing from the spirit and scope of the invention. Those skilled in the art will further appreciate that it is possible to use clockwise and counter clockwise electromagnet flux circuits to counter each other proportionately to control the position of a valve rotor without using a permanent magnet circuit or other suitable spring, but the of automatic centering provided by magnetic centering circuit 160 is advantageous for operation during loss of power.

Those skilled in the art will readily appreciate that it is not necessary to use a fluid bearing of the type described above in order to practice the invention. Any suitable bearing type can be used, however, the fluid bearing described above provides advantages of low friction movement and long service life compared to other bearing types, for example roller or ball bearings.

Trim valve 100 allows for precise trimming of fluid flow through conduit 101 based on the current level applied to one or the other of electromagnets 112 and 114. Trim valve 100 can provide low frequency flow modulation. For example, if it is desired to trim the flow to decrease or increase the flow through conduit 101 by a small amount, a small current can be applied to the appropriate electromagnet 112 or 114. If a larger increase or decrease in flow through conduit 101 is needed, a larger current can be applied to the appropriate electromagnet 112 or 114. There are a variety of uses for trim valves of this type. For example, if a fuel injector is connected in series with a trim valve 100, fuel flow to the injector can be adjusted or trimmed upward or downward as needed to provide the correct flow rate to the injector by applying the appropriate current to trim valve 100.

One exemplary application is for regulating fuel split to a plurality of fuel injectors in a gas turbine engine to improve the combustion pattern factor, as described below. This can compensate for non-uniform fuel injector flow due to manufacturing tolerances, injector wear, and/or any other situation in which adjustment of fuel flow rate between injectors is desired.

With reference again to FIGS. 25-27a, a method of modulating fuel distribution to injectors in a gas turbine engine utilizes a trim valve such as trim valve 100. The method includes magnetically actuating at least one trim valve, e.g. trim valve 100, of a plurality of trim valves in response to sensing an uneven flow distribution among a plurality of injectors in a gas turbine engine. This actuation is performed to adjust fuel flow to at least one individual injector and provides a more even flow distribution among the plurality of injectors. Each trim valve is fluidly connected, for example in a conduit 101, in series with a separate one of the injectors. Each of the injectors can be coupled to a common fuel manifold.

Any of the trim valves can have a specific current applied as needed to actuate a valve rotor thereof, e.g. valve rotor 122, to increase flow to an insufficiently flowing injector. Any one of the trim valves can also be actuated as needed to decrease flow to an excessively flowing injector as needed. If the corresponding injector for a given trim valve is not excessive or deficient in flow volume, no current need be applied to that trim valve, the valve rotor of which will remain in the neutral position. In the event of a power failure, a permanent magnet, e.g. magnet 116, of each trim valve returns the rotor to a neutral flow condition, shown in FIG. 25. Thus, if there is an electrical power failure on board an aircraft, for example, the engines can continue to operate on untrimmed fuel flow to the injectors.

Calibration of trim valve 100 will now be described with reference to FIGS. 3 and 25. The angle of shaft port 136 is stationary relative to housing 104 during normal operation of trim valve 100. However, this angle can be adjusted clockwise or counter clockwise to calibrate trim valve 100. With ring clamp 126 loosened, valve shaft 118 can be rotated clockwise, with respect to the orientation in FIG. 25, to decrease the nominal flow through flow main flow path 131 of trim valve 100. Similarly, counter clockwise adjustment of valve shaft 118 can be performed to increase the nominal flow through main flow path 131. When the desired calibrated position of valve shaft 118 is established, ring clamp 126 can be tightened to fix the angle of shaft port 136 in place.

Tests performed on trim valves constructed in accordance with the present invention were conducted to test the performance of the components at various pressures. The tests are described as follows, with reference to the results shown in FIGS. 28-29. Three test devices were built substantially as described above. One device included a shaft with a plain bearing surface, as shown in FIG. 15. Another device included a valve shaft having a faceted-shaft fluid bearing surface, as shown in FIG. 7. The remaining test device included a valve shaft having a smooth differential-diameter fluid bearing surface, as shown in FIG. 12.

The performance characteristics of the trim valve were determined as a function of fluid bearing design, pressure differential across the valve, input current to the electromagnet, and flow rate. The purpose of the test program was to determine the pressure and current operating envelope for different bearing surface configurations. The valve was tested on a flow rig at differential pressures up to 300 psi and with drive currents up to 1.5 amperes. The test program involved measuring the valve flow on a test rig using calibration fluid at varying pressure differentials across the valve and applying a range of input currents to the magnetic actuator, until the valve rotor reached full stop.

Figure 28:
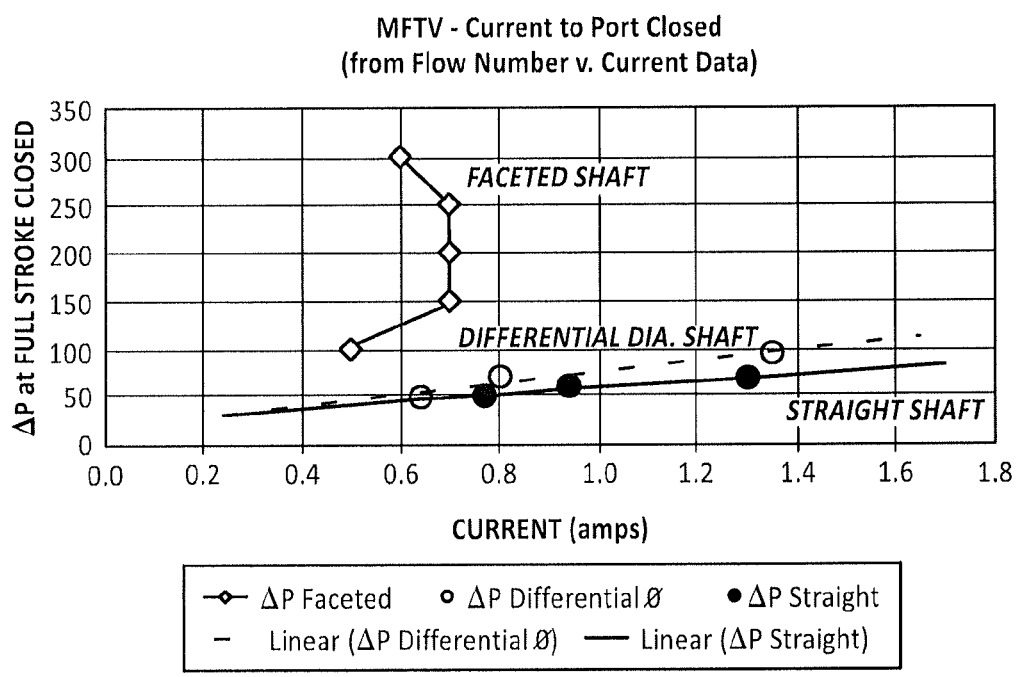
FIG. 28 is a graph showing a plot of data for three test devices constructed in accordance with the present invention, showing current versus pressure differential at a fully closed position of the respective valve rotor.
Figure 29:
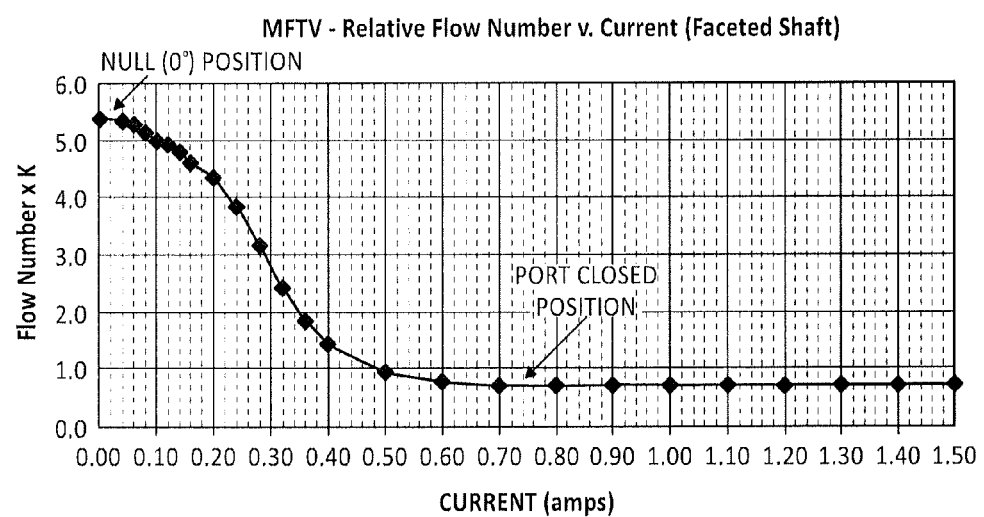
FIG. 29 is a graph showing a plot of data for a test device with faceted bearing surfaces constructed in accordance with the present invention, showing current versus relative flow number data averaged over five test runs.

FIG. 28 summarizes the performance of the three types of fluid bearing configurations tested. The plain bearing configuration had the smallest operational range in terms of pressure differential. The faceted bearing configuration exhibited the best performance with current required to reach the port-closed position remaining relatively constant over a wide range of pressure differentials. FIG. 29 shows relative flow number versus current for the faceted shaft configuration averaged over five test runs. The data in FIG. 29 indicates how the trim valve controls flow as a function of current input.

An exemplary configuration of trim valve 100 has a nominal flow rate of about 1350 pph with a pressure drop of 150 psid. This exemplary configuration can modulate flow to about ±10% of the nominal flow rate and has an operating frequency of about 0.0 to about 12.0 Hz and an operating voltage of about 28 VDC nominal.

Testing has shown that trim valves, such as trim valve 100, may also be used to modulate flow at high frequencies, for example on the order of 1,000 Hz. Such high frequency operation is possible as long as the moment of inertia of the valve rotor is modified for the specific application and frequency, and as long as the accompanying electronics are configured to provide current to the actuator at the desired high frequency. Such modifications are considered to be well within the ability of those skilled in the art. Applications for modulating flow at high frequencies include, for example, dynamic modulation for control of combustion. Exemplary applications are discussed in greater detail in U.S. Patent Application Publication No. 2007/0151252 to Cornwell, et al., which is incorporated by reference herein in its entirety.

The methods and systems of the present invention, as described above and shown in the drawings, provide for trimming flow to individual fuel injectors in a gas turbine engine, for example, with superior properties including improved flow uniformity across all injectors without resorting to increased manufacturing tolerances. The methods and systems described above also provide for trimming flow with high efficiency actuation, and for continued flow in the event of loss of electrical power. The integration of valving and actuation components in a single trim valve also reduces weight and size compared to conventional devices.

While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A trim valve for modulating fuel flow in a gas turbine engine comprising:
   a) a valve housing having an inlet section and an outlet section and defining a longitudinal axis;
   b) a valve shaft aligned with the longitudinal axis and mounted to the valve housing to be stationary with respect thereto, the valve shaft including an internal flow passage in fluid communication with the outlet section of the valve housing;
   c) a valve rotor having a valve rotor housing, a first pair of radially opposed wings extending from the valve rotor housing and a second pair of radially opposed rotor wings extending from the housing aft of the first pair of radially opposed wings, the valve rotor disposed inboard of the valve housing and outboard of the valve shaft for modulating fuel flow through the valve housing, wherein the valve rotor is mounted for rotational movement within the valve housing between a fully open position in which a flow path is defined between the inlet and outlet sections of the valve housing, and a reduced flow position in which the valve rotor at least partially blocks the flow path; and
   d) an electromagnet actuator operatively connected to the valve housing to actuate the valve rotor between the fully open and reduced flow positions to trim flow through the flow path.

2. A trim valve as recited in claim 1, wherein a rotor port is defined through the valve rotor for fluid communication between a space external to the valve rotor and a space internal to the valve rotor.

3. A trim valve as recited in claim 2, wherein a shaft port is defined through the valve shaft for fluid communication between a space external to the valve shaft and the internal flow passage of the valve shaft.

4. A trim valve as recited in claim 3, wherein the rotor port and the shaft port are substantially aligned together with respect to the longitudinal axis of the valve housing, and wherein in the fully open position of the valve rotor, the rotor port and shaft port are substantially aligned circumferentially together and the flow path is defined from the inlet section of the valve housing, through the rotor port, through the shaft port, to the outlet section of the valve housing, and in the reduced flow position of the valve rotor, the rotor port and shaft port are out of alignment circumferentially to reduce flow along the flow path, and in intermediate positions between the fully open and reduced flow positions, the valve rotor partially occludes the shaft port to trim fuel flow along the flow path.

5. A trim valve as recited in claim 1, wherein a fluid bearing is formed between bearing surfaces of the valve shaft and the valve rotor.

6. A trim valve as recited in claim 5, wherein the bearing surface of the valve shaft is faceted.

7. A trim valve as recited in claim 5, wherein the bearing surface of the valve shaft has differential diameters.

8. A trim valve as recited in claim 1, wherein the first pair of radially opposed rotor wings is formed of a magnetic flux permeable material, and wherein the actuator includes a first electromagnet operatively connected to the valve housing to form a first magnetic flux circuit that includes the first pair of rotor wings and is configured to urge the valve rotor in a direction towards one of the fully open and reduced flow positions with an applied current to the first electromagnet.

9. A trim valve as recited in claim 8, wherein the second pair of opposed rotor wings is formed of a magnetic flux permeable material, and wherein the actuator includes a second electromagnet operatively connected to the valve housing to form a second magnetic flux circuit that includes the second pair of rotor wings and is configured to urge the valve rotor in a direction opposite that of the first magnetic flux circuit with an applied current to the second electromagnet.

10. A trim valve as recited in claim 9, wherein the valve rotor includes a third pair of opposed rotor wings formed from a magnetic flux permeable material, and wherein the electromagnet actuator includes a permanent magnet forming a third magnetic flux circuit that includes the third pair of rotor wings for urging the valve rotor to a neutral position between the fully open and reduced flow positions.

11. A trim valve as recited in claim 1, wherein the electromagnet actuator and moment of inertia of the valve rotor are configured and adapted to actuate the valve rotor between the fully open and reduced flow positions at frequencies up to around 1,000 Hz.

12. A trim valve as recited in claim 1, wherein the first pair of radially opposed rotor wings formed of a magnetic flux permeable material, and wherein the electromagnet actuator includes a first electromagnet operatively connected to the valve housing to form a first magnetic flux circuit that includes the first pair of rotor wings and is configured to urge the valve rotor in a direction towards the fully open position with an applied current to the first electromagnet, and wherein the electromagnet actuator includes a second electromagnet operatively connected to the valve housing to form a second magnetic flux circuit that includes the second pair of rotor wings and is configured to urge the valve rotor in a direction towards the reduced flow position with an applied current to the second electromagnet.

13. A trim valve for modulation of fuel flow in a gas turbine engine comprising:
   a) a valve housing having an inlet section and an outlet section;
   b) a valve rotor having a valve rotor housing disposed between the inlet section and the outlet section for modulating fuel flow through the valve housing, wherein the valve rotor is mounted for rotational movement within the valve housing between a fully open position in which a flow path is defined from the inlet section of the valve housing to the outlet section thereof, and a reduced flow position in which the valve rotor at least partially blocks the flow path, wherein the valve rotor includes first and second axially spaced pairs of opposed rotor wings extending from the valve rotor housing formed of a magnetic flux permeable material; and c) an actuator operatively connected to the valve housing to actuate the valve rotor between the fully open and reduced flow positions to trim flow through the flow path, wherein the actuator includes a first electromagnet operatively connected to the valve housing to form a first magnetic flux circuit that includes the first pair of rotor wings and is configured to urge the valve rotor in a direction towards the fully open position with an applied current to the first electromagnet, and a second electromagnet operatively connected to the valve housing to form a second magnetic flux circuit that includes the second pair of rotor wings and is configured to urge the valve rotor in a direction towards the reduced flow position with an applied current to the second electromagnet.

14. A trim valve as recited in claim 13, further comprising a valve shaft inboard of the valve rotor and defining a longitudinal axis, the valve shaft having an internal flow passage in fluid communication with the outlet section of the valve housing and being connected to the valve housing to remain stationary with respect to rotational movement of the valve rotor.

15. A trim valve as recited in claim 14, wherein a rotor port is defined through the valve rotor for fluid communication between a space external to the valve rotor and a space internal to the valve rotor, and a shaft port is defined through the valve shaft substantially aligned together with the rotor port with respect to the longitudinal axis for fluid communication between a space external to the valve shaft and a space internal to the valve shaft, wherein in the fully open position of the valve rotor, the rotor port and shaft port are substantially aligned together circumferentially to form a common aperture of a first size with the flow path defined from the inlet section of the valve housing, through the common aperture, to the outlet of the valve housing, wherein in the reduced flow position of the valve rotor, the rotor port and shaft port are out of alignment to at least partially occlude the common aperture to a second size and thereby reduce flow along the flow path, and wherein in intermediate positions between the fully open and reduced flow positions, the common aperture is sized between the first and second sizes to trim fuel flow along the flow path.

16. A trim valve as recited in claim 14, wherein a fluid bearing is formed between bearing surfaces of the valve shaft and the valve rotor.

17. A trim valve as recited in claim 16, wherein the bearing surface of the valve shaft is faceted.

18. A trim valve as recited in claim 16, wherein the bearing surface of the valve shaft has differential diameters.

19. A trim valve as recited in claim 13, wherein the valve rotor includes a third pair of opposed rotor wings formed of a magnetic flux permeable material, and wherein the actuator includes a permanent magnet forming a third magnetic flux circuit that includes the third pair of rotor wings for urging the valve rotor to a neutral position between the fully open and reduced flow positions.

20. A method of modulating fuel distribution to injectors in a gas turbine engine comprising magnetically actuating at least one trim valve of a plurality of trim valves in response to sensing an uneven flow distribution among a plurality of injectors in a gas turbine engine to adjust fuel flow to at least one individual injector to provide a more even flow distribution among the plurality of injectors, wherein each trim valve having a valve rotor that includes a valve rotor housing, a first pair of radially opposed wings extending from the valve rotor housing and a second pair of radially opposed rotor wings extending from the valve housing aft of the first pair of the radially opposed wings, each trim valve is fluidly connected in series with a separate injector.

21. A method as recited in claim 20, wherein the step of actuating includes changing an applied current to an electromagnet of any one of the trim valves as needed to actuate a valve rotor thereof to increase flow to an insufficiently flowing injector corresponding thereto, and wherein the step of actuating includes changing an applied current to an electromagnet of any one of the trim valves as needed to actuate a valve rotor thereof to decrease flow to an excessively flowing injector corresponding thereto.

22. A method as recited in claim 20, further comprising a step of actuating each of the flow trim valves with a respective permanent magnet thereof to a neutral flow condition in the absence of a current applied to electromagnets for actuating the flow trim valves to increased or decreased flow conditions.

* * * * *